United States Patent
Wang et al.

(10) Patent No.: US 11,756,210 B2
(45) Date of Patent: Sep. 12, 2023

(54) VIDEO INPAINTING VIA MACHINE-LEARNING MODELS WITH MOTION CONSTRAINTS

(71) Applicant: Adobe Inc., San Jose, CA (US)

(72) Inventors: Oliver Wang, Seattle, WA (US); Matthew Fisher, San Francisco, CA (US); John Nelson, Seattle, WA (US); Geoffrey Oxholm, Albany, CA (US); Elya Shechtman, Seattle, WA (US); Wenqi Xian, New York, NY (US)

(73) Assignee: Adobe Inc., San Jose, CA (US)

( * ) Notice: Subject to any disclaimer, the term of this patent is extended or adjusted under 35 U.S.C. 154(b) by 236 days.

(21) Appl. No.: 16/817,100

(22) Filed: Mar. 12, 2020

(65) Prior Publication Data
US 2021/0287007 A1  Sep. 16, 2021

(51) Int. Cl.
*G06V 20/40* (2022.01)
*G06T 7/246* (2017.01)
(Continued)

(52) U.S. Cl.
CPC ............. *G06T 7/246* (2017.01); *G06N 20/00* (2019.01); *G06V 10/44* (2022.01); *G06V 10/56* (2022.01); *G06V 20/41* (2022.01); *G06V 20/46* (2022.01)

(58) Field of Classification Search
CPC .... G06V 20/46; G06V 10/44; G06V 30/1801; G06V 30/18105; G06V 30/182;
(Continued)

(56) References Cited

U.S. PATENT DOCUMENTS 6,667,774 B2   12/2003   Berman et al.
9,741,144 B2   8/2017    Paris et al.
(Continued)

FOREIGN PATENT DOCUMENTS

EP   2608148   6/2013

OTHER PUBLICATIONS

Granados, Miguel, et al. "How not to be seen—object removal from videos of crowded scenes." Computer Graphics Forum. vol. 31. No. 2pt1. Oxford, UK: Blackwell Publishing Ltd, 2012. (Year: 2012).*
(Continued)

*Primary Examiner* — Amandeep Saini
*Assistant Examiner* — Denise G Alfonso
(74) *Attorney, Agent, or Firm* — Kilpatrick Townsend & Stockton LLP

(57) ABSTRACT

Certain aspects involve video inpainting in which content is propagated from a user-provided reference frame to other video frames depicting a scene. For example, a computing system accesses a set of video frames with annotations identifying a target region to be modified. The computing system determines a motion of the target region's boundary across the set of video frames, and also interpolates pixel motion within the target region across the set of video frames. The computing system also inserts, responsive to user input, a reference frame into the set of video frames. The reference frame can include reference color data from a user-specified modification to the target region. The computing system can use the reference color data and the interpolated motion to update color data in the target region across set of video frames.

20 Claims, 10 Drawing Sheets

(51) Int. Cl.
*G06N 20/00* (2019.01)
*G06V 10/44* (2022.01)
*G06V 10/56* (2022.01)

(58) Field of Classification Search
CPC ........... G06V 30/1823; G06V 30/1826; G06V 30/1829; G06V 30/1831; G06V 30/1834; G06V 30/1837; G06V 10/56; G06V 20/41; G06K 9/00; G06N 3/0454; G06N 3/08; G11B 27/031; G11B 27/34; G06T 7/246

See application file for complete search history.

(56) References Cited

U.S. PATENT DOCUMENTS

| | | | |
|---|---|---|---|
| 9,892,537 | B2 | 2/2018 | Paris et al. |
| 10,049,435 | B2 | 8/2018 | Paris et al. |
| 10,534,525 | B1 | 1/2020 | Suchland |
| 10,872,637 | B2 | 12/2020 | Oxholm et al. |
| 10,873,697 | B1 | 12/2020 | Jain et al. |
| 11,081,139 | B2 | 8/2021 | Oxholm et al. |
| 2006/0257042 | A1 | 11/2006 | Ofek et al. |
| 2008/0112642 | A1 | 5/2008 | Matsushita et al. |
| 2013/0128121 | A1* | 5/2013 | Agarwala ............ G11B 27/031 348/E5.077 |
| 2016/0111129 | A1 | 4/2016 | Crivelli |
| 2017/0228875 | A1 | 8/2017 | Nash et al. |
| 2018/0322672 | A1 | 11/2018 | Shibata et al. |
| 2020/0143541 | A1 | 5/2020 | Wang et al. |
| 2021/0090279 | A1* | 3/2021 | Dekel .................... G06T 7/579 |
| 2021/0272294 | A1 | 9/2021 | Ling et al. |
| 2021/0390697 | A1 | 12/2021 | Marder Gilboa et al. |

OTHER PUBLICATIONS

U.S. Appl. No. 16/378,906, Non-Final Office Action, dated Oct. 28, 2020, 20 pages.
U.S. Appl. No. 16/585,433, Final Office Action, dated Jul. 24, 2020, 13 pages.
U.S. Appl. No. 16/585,433, First Action Interview Office Action Summary, dated Jul. 28, 2020, 12 pages.
U.S. Appl. No. 16/585,433, First Action Interview Pilot Program Pre-Interview Communication, dated Apr. 29, 2020, 4 pages.
U.S. Appl. No. 16/585,433, Notice of Allowance, dated Aug. 25, 2020, 5 pages.
Gao, Chen, et al., "Flow-edge Guided Video Completion", http://chengao.vision/FGVC/files/FGVC.pdf, European Conference on Computer Vision, 2020, 17 pages.
Xu, Rui, et al., "Deep Flow-Guided Video Inpainting," https://nbei.github.io/video-inpainting.html, ,2019 4 pages.
Zhang, Richard, et al., "Colorful Image Colorization," arXiv: 08511v5, Oct. 5, 2016, 29 pages.
Yu, Jiahui, et al., "Generative Image Inpainting with Contextual Attention," arXiv:1801.07892v2, Mar. 21, 2018, 15 pages.
Yu, Jiahui, et al.,"Free-Form Image Inpainting with Gated Convulution," arXiv:1806.03589v2, Oct. 22, 2019, 17 pages.
Xu, Rui, et al., "Deep Flow-Guided Video Inpainting," Conference on Computer Vision and Pattern, IEEE, May 2019, 10 pages.
Huang, Jia-Bin, et al., "Temporally Coherent Completion of Dynamic Video", ACM Transactions on Graphics, vol. 35, Issue 6, Article No. 196, Nov. 2016, 11 pages.
Wexler, Yonatan., et al., "Space-Time Video Completion", IEEE Transactions on Pattern Analysis and Machine Intelligence, vol. 29, Issue 3, Mar. 2007, 8 pages.
Adobe, "Project Cloak: Content-Aware Fill for Video", https://www.youtube.com/watch?v=Po-TLPnlrIU, Nov. 10, 2017, accessed Apr. 9, 2019, 3 pages.
Kunz, Meredith Alexander, Adobe Research, "Cloak: Remove Unwanted Objects in Video", https://research.adobe.com/news/cloak-remove-unwanted-objects-in-video, Dec. 11, 2017, accessed Apr. 9, 2019.
Adobe Blog, Adobe Communication Team "Peek Behind the Sneaks: #Project Cloak—Filmmakers Gain the Power of Invisibility", https://theblog.adobe.com/peek-behind-sneaks-filmmakers-gain-power-invisibility/, Jan. 10, 2018, accessed on Apr. 9, 2019, 4 pages.
Mocha Pro, Mocha Pro: Object Removal & Clean Plating, https://www.youtube.com/watch?v=_OUxcFHGOb8, Feb. 13, 2018, accessed Apr. 9, 2019.
Search and Examination Report from related Great Britain Application GB1911506.2, dated Feb. 19, 2020, 7 pages.
U.S. Appl. No. 16/378,906, "Corrected Notice of Allowability", dated Jun. 28, 2021, 2 pages.
U.S. Appl. No. 16/378,906, Notice of Allowance, dated Mar. 10, 2021, 12 pages.
Ng et al., "Data Compression and Transmission Aspects of Panoramic Videos", IEEE Transactions on Circuits and Systems for Video Technology, vol. 15, No. 1, Jan. 2005, pp. 82-95.
Ruegg et al., "DuctTake: Spatiotemporal Video Compositing", Computer Graphics Forum, Eurographics, vol. 32, No. 2, 2013, 11 pages.
U.S. Appl. No. 17/196,581, "Non-Final Office Action", dated Nov. 16, 2022, 13 pages.
U.S. Appl. No. 17/196,581, "Notice of Allowance", dated Mar. 8, 2023, 8 pages.
U.S. Appl. No. 17/196,581, "Notice of Allowance", dated Jun. 30, 2023, 9 pages.

* cited by examiner

VIDEO INPAINTING VIA MACHINE-LEARNING MODELS WITH MOTION CONSTRAINTS

TECHNICAL FIELD

This disclosure relates generally to automated processing of video content for video playback systems. More specifically, but not by way of limitation, this disclosure relates to video inpainting using machine-learning models having motion constraints based on sparse feature points or motion values.

BACKGROUND

Certain video editing programs include features for replacing content in a target region with other desired content, such as user-provided content or content that is copied or derived from other regions in the video. As one example, video inpainting methods are used to fill spatiotemporal holes in a video with content that is generated using remaining parts of the video, user input, or data-driven methods trained on other visual content. Video inpainting is used for different applications, such as, but not limited to, unwanted object removal, video stabilization, logo or watermark removal in broadcast videos, and restoration of damaged film content, etc.

SUMMARY

Certain aspects involve using machine-learning models for video inpainting a target region of a set of video frames having motion constraints. These motion constraints are used to estimate pixel motion within the target region, and thereby, perform video inpainting with respect to the target region. For instance, aspects described herein can perform video inpainting using motion constraints for a target region that more closely matches an estimated motion within the target region. One example method includes one or more processing devices performs operations that includes accessing a scene depicting a reference object and a set of sparse feature points defining a three-dimensional model of the reference object. The set of sparse feature points are computed from changes in position of the reference object across video frames comprising the scene, and the accessed scene includes an annotation identifying a target region to be modified in one or more of the video frames. In addition, the operations include determining, from the three-dimensional model of the reference object, a motion constraint. Further, the operations include computing a target motion of a target pixel subject to the motion constraint. Additionally, the operations include updating color data of the target pixel to correspond to the target motion.

Other aspects described herein can perform machine-learning tasks for video inpainting by interpolating a target motion for a target region using motion constraints. For example, one computing system includes a processing device and a non-transitory computer-readable medium communicatively coupled to the processing device and storing program code. The processing device can be configured to execute the program code and thereby performing operations that include accessing a set of video frames depicting a scene. The scene can include a reference object. In addition, the operations include generating a set of sparse feature points based on a first motion in the scene. The first motion corresponds to the reference object, and the set of sparse feature points include one or more sparse feature points corresponding to the reference object. The one or more sparse feature points define a motion constraint. Further, the operations include interpolating a target motion of a target pixel within a target region of the scene, wherein the target motion is subject to the motion constraint. Additionally, the operations include updating color data of the target pixel based on the target motion.

These illustrative examples are mentioned not to limit or define the disclosure, but to aid understanding thereof. Additional aspects are discussed in the Detailed Description, and further description is provided there.

BRIEF DESCRIPTION OF THE DRAWINGS

Features, aspects, and advantages of the present disclosure are better understood when the following Detailed Description is read with reference to the accompanying drawings.

DETAILED DESCRIPTION

Figure 1:
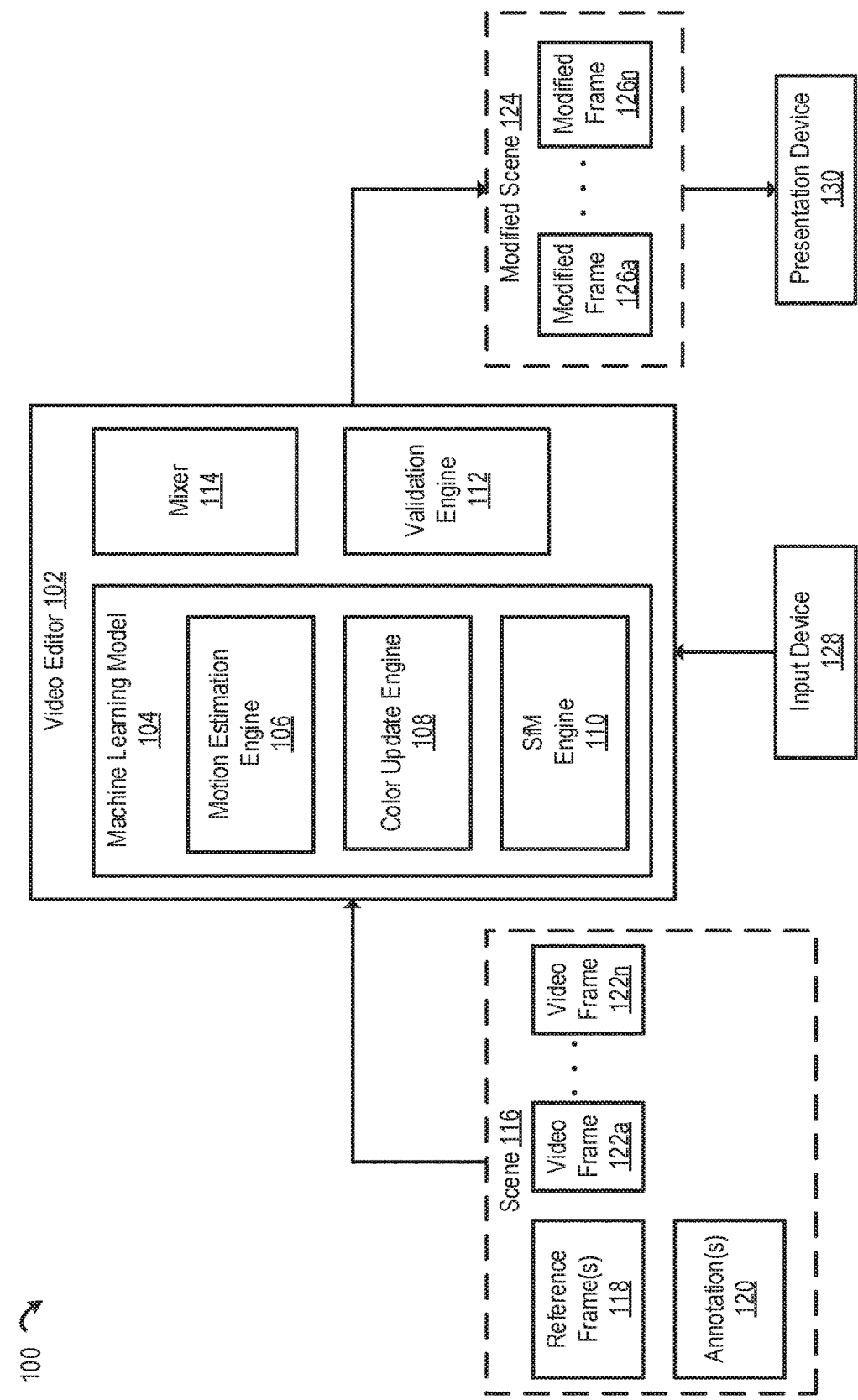
FIG. 1 depicts an example of a video processing environment for video inpainting using machine-learning models having motion constraints, according to certain aspects of this disclosure.

Certain aspects involve video inpainting using machine-learning models having motion constraints based on sparse feature points or motion values. For instance, a video editor assists with modifying a target region of a video, which includes portions of video frames depicting an object to be removed or modified, by using the computed motion of a scene depicted in the video frames to identify content to be copied into the target region. Such a computation of scene motion includes estimating, prior to modifying the target region, what the motion of the scene would be within the target region based on the motion of other pixels in the scene. The video editor can compute this motion by applying a machine-learning model that is trained to estimate motion within a target region subject to motion constraints. Examples of motion constraints include a reference motion computed from sparse feature points, a reference motion specified via one or more user inputs, or some combination thereof. The video editor can propagate color information into the target region based on this estimated motion.

The following non-limiting example is provided to introduce certain aspects. In this example, a video editor accesses a set of video frames, such as an input video being modified by a user with the video editor, that depicts a scene. For instance, a depicted scene includes a football game in progress as well as a spectator that disrupts the view of the football game by walking in front of the camera. The set of video frames includes (or is otherwise associated with) one or more annotations identifying a target region that corresponds to a location associated with the spectator to be modified in one or more video frames comprising the scene. For instance, the video editor could receive user inputs that identify the spectator in the set of video frames.

In some cases, the user inputs can include two-dimensional (2D) points that can be used to identify one or more boundaries of the target region (e.g., boundary points). The user inputs can include sparse feature points that identify features that correspond to one or more locations of an object within the target region associated with the spectator. Feature points include characteristics associated with an object that indicate one or more spatiotemporal features associated with the object (e.g., a pixel location, pixel value, pixel intensity, brightness, axis of rotation, relative distance to one or more other feature points (e.g., boundary points), a relationship to a group of pixels or region, etc.).

In some examples, the sparse feature point can be 2D sparse feature points or three-dimensional (3D) sparse feature points. In additional or alternative aspects, the video editor could obtain similar 3D sparse feature points that correspond to locations associated with an object associated with the spectator from a structure from motion (SfM) model. For instance, a SfM model can provide a 3D reconstruction of a particular object located proximate to the spectator from the set of video frames. The SfM model can perform a process that computes the 3D model of the reference object using changes in a relative position of the particular object (e.g., spatiotemporal changes) across the set of video frames. The video editor could use these boundary points and sparse feature points as inputs to annotate the spectator in the set of video frames that comprise the scene.

Continuing with this example, the video editor can, for example, identify a reference frame that has been provided to the video editor via one or more inputs. The reference frame can include one or more reference objects that have been created or selected, automatically or with user input, in the target region. These reference objects are generated by applying a modification to the target region. For instance, in the scene of a football game described above, the video frames may not include any depiction of a certain portion of the football field, such as the fifty-yard line, because the spectator was between the camera and that portion of the football field for all frames captured by the camera. The video editor can include functionality that allows a user to create or upload a reference frame that has been edited to include the fifty-yard line of the football field.

For instance, the video editor can receive a set of inputs that recreates the fifty-yard line by mirroring other, similar portions of the football field depicted in the scene (e.g., the thirty-yard line) and refining specific details (e.g., changing a depiction of a "3" to a "5"). In this manner, a user can instruct the video editor to apply a modification (e.g., a reference frame depicting the fifty-yard line in the target region) to one of the video frames of a scene being edited with the video editor. In additional or alternative aspects, the user can instruct the video editor to apply a modification to a 3D object (e.g., a reference frame depicting a 3D yardage marker corresponding to the fifty-yard line in the target region) to one of the video frames of a scene being edited with the video editor, The video editor can use an estimated motion of the scene to propagate reference color data from this reference frame to other video frames in the scene. For instance, the video editor can compute a boundary motion for one or more boundary points of the target region within the scene. The one or more boundary points can include boundary pixels neighboring the target region (e.g., the "spectator" object) in a set of video frames. The boundary motion indicates how video content along the one or more boundary points move within the scene as the video frames progress. If the scene depicts the football game behind the spectator, the various objects that comprise the football game (e.g., the field, the players, etc.) could move within the scene due to the movement of the objects themselves when captured (e.g., a player running down the field), the movement of the camera (e.g., due to the camera panning from one end of the field to the other), changing the zoom on the camera, or some combination thereof.

To remove the "spectator" object in this example, the video editor estimates the motion within the target region. Estimating the motion includes interpolating, from the boundary motion computed for the boundary pixels, a target motion within the target region, both of which may be constrained by sparse feature points of a reference object within the video frames. Thus, the estimated motion within the target region is a function of the combined computations of motion for target pixels that must conform in color data and geometric shape to motion constraints provided by the sparse feature points. The video editor uses the interpolated motion to update color data of target pixels within the target region. Updating color data of target pixels within the target region can include updating the target region in a first video frame in accordance with reference color data from the reference frame, based on the motion constraints of the sparse feature points, and then propagating this change from the first video frame to a second video frame, from the second video frame to a third video frame, and so on.

As a simplified example, the reference frame can depict a "fifty-yard line" object rather than the "spectator" object that disrupts the scene in other video frames. The target region for "spectator" object itself includes boundary pixels that follow a path from a first frame to a second frame. The video editor can interpolate, from the path followed by the boundary pixels, a similar path that would occur for an object that the user wishes to insert inside the target region (e.g., the path of the "fifty-yard line" object). But in this case, the target region is constrained to the substantially white area of the path within the boundaries of the target region. In addition, sparse feature points may include an axis of rotation associated with the substantially quadrilateral-shaped target region within the boundaries of the "fifty-yard line" object. In one example, an ultra-high-definition (UHD) video may include unpainted blades of grass within the otherwise mostly white target "fifty-yard line" object. These blades of grass and/or axes of rotation can be used by the video editor as motion constraints. The interpolated motion within the target region allows the video editor to estimate where the "fifty-yard line" object would be within the target region, e.g., trace the pixels depicting the "fifty-yard line" object from the reference frame to expected positions in other frames of the scene.

The video editor can therefore copy reference color data of the pixels depicting the "fifty-yard line" object from the reference frame to a first frame that has the target region annotated. In some cases, the video editor can modify the copied color data for consistency with color data outside the target region. For instance, if the reference frame depicts a scene (and the "fifty-yard line" object) from a view at one angle and the first frame depicts the scene from a slightly different view at a different angle, the video editor can modify the copied version of the "fifty-yard line" object so that the "fifty-yard line" object appears to be captured from the same view as the rest of the scene in the first frame. The video editor can replicate this process for subsequent video frames. For instance, the video editor can copy color data of the "fifty-yard line" object from the first frame to the target region a second frame, and modify the "fifty-yard line" object in the second frame for consistency with other color data outside the target region in the second frame. Similarly, the video editor can copy the "fifty-yard line" object from the second frame to a third frame and perform any necessary modifications.

For instance, the "fifty-yard line" object mentioned above may include UHD blades of grass or a particular axis of rotation that may require different color data. Thus, the video editor may copy the "fifty-yard line" object, subject to these motion constraints, and thereby modify the "fifty-yard line" object to include the UHD blades of grass or an axial rotation. In certain cases, the video editor may determine that a nearby 3D object or a sub-region of the "fifty-yard line" object requires modification. For example, a 3D "yardage marker" object corresponding to the "fifty-yard line" object may require modification to ensure the a 3D "yardage marker" object does not appear to have a geometric distortion (e.g., a parallax effect, pulling effect (e.g., a stretched background image), perspective distortion, warp, axial rotation, radial distortion, barrel distortion, pincushion, asymmetry, compression, elongation, texture gradient, image gradient, or a combination of these). The video editor can continue this process for other frames depicting the scene, thereby replacing the disruptive "spectator" object in the video with a user-created "fifty-yard line" object.

As described herein, certain aspects provide improvements to computing systems used for editing video content. For instance, existing video inpainting techniques can, for example, filling a selected portion of frame (e.g., a hole region where an object was removed) with content sampled from other parts of the frame. But for frames that depict more complex, 3D, partially occluded, or fully occluded objects (e.g., a hole region in the middle of a 3D object with detailed features or large variation in color), these automated techniques can introduce inaccuracies in the filled-in region (e.g., invalid pixels, parallax effects, or visually distorted objects), and propagating this inaccurately filled-in region across a video leads to accumulation of error. By contrast, certain aspects described herein can reduce the amount of error in a video inpainting process. For instance, by inserting a reference frame into one or more locations in a sequence of frames that are constrained by sparse feature points that correspond to 3D feature points of a reference object in the reference frame, a more accurate version of such a filled-in region can be used as the basis for an automated video inpainting process in other frames of the video by maintaining a structural integrity of the reference object. The structural integrity of the reference object, within the filled-in region, can be maintained by applying motion constraints to the reference object, thereby ensuring an accurate perspective (e.g., color, shape, orientation) of the reference object based on one or more spatial relationships between the sparse feature points of the reference object. Consequently, the color information propagated from the filled-in region to other frames can more realistically depict a desired scene (e.g., a scene in which a target object has been removed). Thus, aspects described herein improve computer-implemented processes performed by video-editing tools.

Example of an Operating Environment for Video Inpainting Via User-Provided Reference Frames Referring now to the drawings, FIG. 1 depicts an example of a video editing environment 100 for performing video inpainting with user-provided reference frames. Video inpainting methods can involve filling target regions in a video with content from other parts of the video, content provided via user input, or content generated via data-driven methods trained on other visual content. The video editing environment 100 includes a set of communicatively coupled video editing components. These components (e.g., video editing tools) include a video editor 102 that can be executed on one or more computing devices, an input device 128 that can be used to provide commands to the video editor 102, and a presentation device 130 that displays video content to a user.

The video editor 102 includes program code for displaying and editing video content. For instance, the video editor 102 can include program code for rendering content for display, program code for creating one or more instances of event listeners or other suitable objects for receiving input from input devices (e.g., input device 128, a mouse, a touchscreen, etc.), and program code for modifying color information for pixels in one or more frames of video content, etc.

In the example depicted in FIG. 1, the video editor 102 includes a machine learning model 104. The machine learning model 104 may use one or more suitable deep learning techniques. Examples of suitable deep learning techniques include techniques using a deep neural network (e.g., Flow-FillNet, deep flow completion network (DFC-Net), alternating direction method of multipliers (ADMM) network, etc.), a convolutional neural network (e.g., a region convolutional neural network ("R-CNN"), Fast R-CNN, or Faster R-CNN), a deep residual network (e.g., ResNet-101), etc. The machine learning model 104 includes a motion estimation engine 106, a color update engine 108, and an SfM engine 110.

The motion estimation engine 106 includes program code that, when executed by processing hardware, performs one or more operations for estimating (e.g., interpolating) a target motion of pixels bordering a target region across a set of video frames. The target motion of pixels associated with an object or region within a set of frames includes an optical spatiotemporal flow that occurs behind a masked region (e.g., the target region) over a duration of time. The motion estimation engine 106 also includes program code that, when executed by processing hardware, performs one or more operations for estimating the motion of pixels within the target region across a set of video frames (e.g., video frames 122*a-n*).

In some aspects, the target region can be automatically generated by the machine learning model 104. In some aspects, the target region can be obtained by one or more user inputs that specify one or more parameters of the target region (e.g., boundary points, a target object within the target region to be replaced, a feature of a target object within the target region, etc.). In some aspects, the motion estimation engine 106 uses sparse feature points associated with one or more reference objects as constraints to reduce geometric distortions within the target region. These sparse feature points can, for instance, be user-specified via one or more user inputs. In additional or alternative aspects, the video editor 102 may obtain sparse feature points from one or more 3D reconstructions of reference objects. The machine learning model 104, motion estimation engine 106, or other suitable program code can also be used to create a three-dimensional model.

The color update engine 108 includes program code that, when executed by processing hardware, performs one or more operations for modifying color information within the target region based on the estimated motion. The color update engine 108 may obtain a target motion of pixels associated with an object or region from the motion estimation engine 106. In some aspects, the color update engine 108 can also use constraints, such as boundary points or sparse feature points associated with a reference object, to provide pixel information (e.g., a pixel value) for one or more target pixels in a target region. For instance, the color update engine 108 can use a target motion of target pixels provided by the motion estimation engine 106 to determine pixel values associated with a reference object selected to replace a target object. The color update engine 108 can modify a pixel value based on the target motion of the target pixels by determining whether a given pixel location corresponds to a region within or outside of the reference object. Similarly, the color update engine 108 can modify a pixel value based a viewing angle, a presence of another object, or an object's partial or full occlusion. In some aspects, the color update engine 108 can modify pixel values based on sparse constraints, altering pixel values to conform with geometric shapes obtained from the motion estimation engine 106.

The SfM engine 110 includes program code that, when executed by processing hardware, performs one or more operations for providing sparse feature points for a 3D reconstruction of a reference object within the target region based on the estimated motion. In some aspects, the SfM engine 110 can obtain user inputs that correspond to 2D features identified from a user input. The SfM engine 110 can copy these 2D features and annotate a target region with the 2D features across the set of video frames (e.g., with annotations 120). In some aspects, the SfM engine 110 can detect and map 3D features.

For instance, the SfM engine 110 can include program code that estimates 3D structures across the set of video frames by using a regional motion detection algorithm or other 3D reconstruction technique (e.g., COLMAP, simultaneous localization and mapping (SLAM), edge detection, corner points, scale-invariant feature transform (SIFT), speeded-up robust features (SURF), random sample consensus (RANSAC), etc.) In some aspects, the SfM engine 110 can map 3D features to create a 3D pixel map. In some aspects, the 3D pixel map may include a 2D bitmap with different coded values representative of particular color depth values (e.g., grayscale values) and/or coordinate locations. In some aspects, the 3D pixel map may include one or more voxels that represent volumetric relationships within a 3D image. In one example, a voxel map may include relative positions of 3D voxels based on regularly sampled values, a homogeneously-filled space, or a non-homogeneously-filled space. The SfM engine 110 can provide such sparse feature points to the motion estimation engine 106, color update engine 108, or both. In some aspects, the SfM engine 110 can provide such sparse feature points via one or more color maps corresponding to one or more objects within a reference frame 118. In some aspects, the motion estimation engine 106 and/or color update engine 108 can use sparse feature points as constraints associated with the target region.

In the example video editing environment 100 depicted in FIG. 1, and in addition to the machine learning model 104, the video editor 102 also includes a validation engine 112. The validation engine 112 includes program code that, when executed by processing hardware, performs one or more operations for validating the motion estimation and updated colors of pixels associated with a target region across a set of video frames. In some aspects, the validation engine 112 can perform substantially similar computations to those described above with respect to the machine learning model 104. In one example, the validation engine 112 can randomly select two sequential frames to determine a target motion of target pixels within a target region to validate a result produced by the machine learning model 104. In some aspects, the validation engine 112 can compute a target motion of target pixels in a reverse temporal order. For instance, the validation engine 112 may select two or more frames of a set of frames and determine a target motion of target pixels in both forward and reverse temporal orders.

In the example video editing environment 100, the video editor 102 depicted in FIG. 1 also includes a mixer 114. The mixer 114 includes program code that, when executed by processing hardware, performs one or more operations for generating motion videos having inpainted target regions using a combination of information obtained from the motion estimation engine 106 and the color update engine 108 across a set of video frames. The image mixer 114 can combine the abovementioned information to arrange and generate images depicting the inpainted target regions within each video frame of the set of video frames. The image mixer 114 can output the generated images (e.g., modified scene 124) to one or more computing devices. It should be appreciated that the image mixer 114 may generate the images by blending, layering, overlaying, merging, slicing, or any other suitable audio visual integration technique.

While FIG. 1 depicts a video editor 102 that includes a machine learning model 104 (having a motion estimation engine 106, a color update engine 108, and a SfM engine 110), a validation engine 112, and a mixer 114, other implementations are possible. For instance, in various aspects, one or more of these engines can be omitted, the functionality of these engines can be combined into a single software engine, or one or more of these engines can be included in software that is separate from and in communication with the video editor 102.

The video editor 102 is used to remove or modify one or more objects or other features in video content using one or more user-provided reference frames 118. (An example of object modification is discussed below with respect to FIGS. 2-5, and an example of using motion information is discussed below with respect to FIGS. 6-9.) Video content could include, for example, a sequence of video frames 122*a* through 122*n*. The sequence of video frames can collectively comprise a scene 116. Examples of removing or modify objects or other features include removing people or large objects (for color grading, or producing 3D films), removing dark areas in the video resulting from dust on a lens of a camera, removing unwanted objects (trash, accidental set element), removing logos (for stock video or commercialization), removing distractors (labels, artifacts, distortions, etc.), changing appearance of something in a video by modifying only one frame or a small set of frames, etc. In some aspects, removing or modify objects or other features can include objects or features that appear during one or more camera movements. In addition to a camera panning mentioned above, objects or features may appear in one or more video frames of the scene 116 during zooming, tilting, dollying, trucking, crane shots. In some aspects, objects or features may appear in video frames of the scene 116 based on a particular focal point or point of view associated with a direction corresponding to a camera angle that is dictated by a position of the camera.

In an illustrative example, the video editor 102 fills a target region, such as a hole region, in a set of video frames. A hole region can be a contiguous collection of pixels in the image that are transparent or semi-transparent (e.g., translucent, having some level of opacity, or being partially opaque or occluded). In some aspects, a hole region can be a target region or a sub-region of a target region. For instance, a sub-region can include a part of a target region that represents an embedded portion of a target region (e.g., a watermark). In some aspects, a sub-region can include an equally-apportioned visual area (e.g., a quartile). And in some aspects, a sub-region may correspond to a feature region, such as a sub-region corresponding to a face of a person that is a target within a corresponding target region.

In this example, the video editor 102 receives, from the input device 128, user input that adds one or more annotations 120 to the video frames 122*a*-122*n*. An annotation 120 is data that is included in or associated with video content to identify the target region in the set of video frames 122*a*-122*n*. In one example, the user input includes drawing a rough mask around a target object in one or more frames (e.g., tracing or rotoscoping the target object), where the one or more objects indicated by the mask are tracked over a sequence of frames (e.g., over a duration of time). In some aspects, the video editor 102 can in-fill identified target regions using one or more selected keyframes within a set of video frames.

Continuing with this example, the video editor 102 applies, responsive to one or more command inputs received via the input device 128, a video inpainting process to generate or otherwise identify target pixel data (e.g., location, pixel value, grayscale value, intensity, other color information, format, type, layout, etc.). The target pixel data is used to modify the target region. In particular, the video editor 102 modifies color information of pixels in the target region using the target pixel data.

For instance, the video editor 102 can copy color information from pixels in the reference frame 118 to certain pixels of a video frame, e.g., video frame 122*b*. In some aspects, the video editor 102 can modify the color information in the video frame 122*b* so that the appearance of a reference object (e.g., the object comprising reference pixels with copied color information) in the video frame 122*b* is consistent with other objects depicted in a first video frame 122*a*. As a simplified example, the reference frame 118 can depict a target region within a scene 116 from a certain viewing angle, whereas the video frame 122*b* can depict the target region in the scene 116 from a different viewing angle. Thus, simply copying a reference object (e.g., color information in one or more reference pixels) from the reference frame 118 to the video frame 122*b* may result in the reference object within video frame 122*b* having an angle that differs from the rest of the scene 116 in the video frame 122*b*. To avoid this result, the video editor 102 can modify the color information copied from the reference frame 118 so that the reference object, as depicted in the video frame 122*b*, appears consistent with other objects in the video frame 122*b* having the same viewing angle. The video editor 102 can similarly copy (and, if necessary, update) color information from pixels in the video frame 122*b* to pixels of a subsequent one of the video frames. (The pixels that are updated in each video frame are identified using an estimated motion of a scene, as described in further detail below with respect to FIGS. 6-9.) In this manner, the video editor 102 generates a modified scene 124 having one or more modified frames 126*a*-126*n* for display on the presentation device 130.

Figure 2:
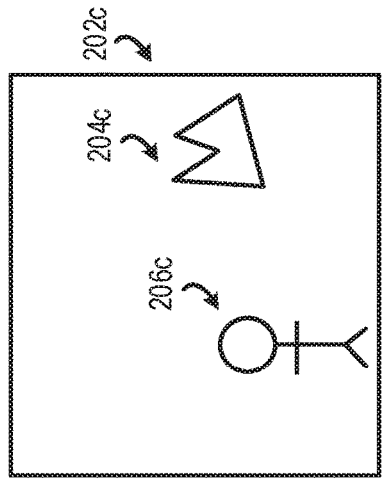
FIG. 2 depicts an example of a video that can be modified with the video processing environment of FIG. 1, according to certain aspects of this disclosure.
Figure 2:
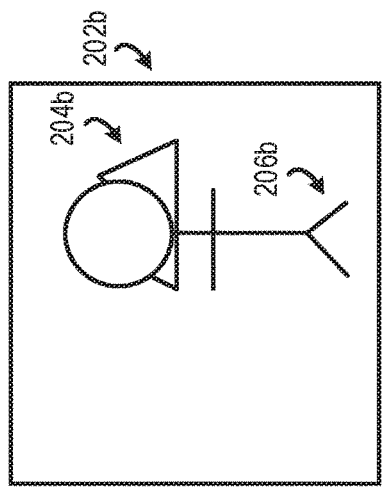
Figure 2:
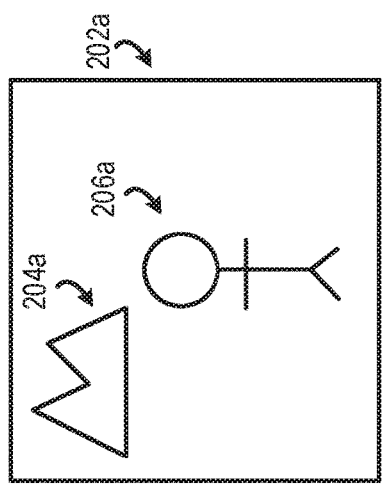

FIG. 2 depicts an example of a video 200 that can be modified using the video editing environment 100, according to certain aspects of this disclosure. In this example, the video editor 102 identifies, based on one or more inputs from the input device 128, an object (e.g., a stick person 206*a*-206*c*) to be removed from a scene (e.g., scene 116). For instance, the video editor 102 or other suitable software could receive a user input (e.g., a drawing input) that selects one or more portions of the stick person 206*a* depicted in a first frame 202*a* from a set of video frames. The video editor 102 or other suitable software annotates the first frame 202*a* to specify that the stick figure identified via the user input should be removed.

In some aspects, the video editor 102 can propagate the identification of an object in one frame of a scene to other frames of the scene. For instance, the video editor 102 can propagate the identification of the stick person 206*a* appearing in the first frame 202*a* of the set of frames to identify the same stick person 206*b* and 206*c* in a second frame 202*b* and again in a third frame 202*c*, respectively. In some aspects, the video editor 102 can propagate such an identification with an annotation (e.g., annotation 120) associated with instructions for removal of a depicted object. For instance, the annotation 120 can be a mask or other data that segments a target object from other objects in a frame.

In some aspects, the color update engine 108 performs a pixel replacement operation or other color-modification operation with respect to a hole region associated with the stick person 206*a*-206*c*. For instance, the color update engine 108 can identify one or more replacement objects that are depicted within a scene, appearing in one or more frames temporally located prior to the first frame 202*a* of the set of video frames, subsequent to the first frame 202*a*, or both. In some aspects, a replacement object may be obtained from a reference frame (e.g., the reference frame 118 of FIG. 1).

In the example of FIG. 2, the color update engine 108 identifies pixels included in a mountain range object 204*a*-204*c* that is depicted in the scene. Frames 202*a* and 204*c* are temporally located before and after the frame 202*b*, respectively, each of which depicts respective mountain range objects 204*a* and 204*c*. In this example, the mountain range objects 204*a* and 204*c* are depicted without a corresponding stick person (e.g., stick person 206*a* and 206*c*) standing in front of the mountain range objects 204*a* and 204*c*. But the stick person 206*b* is spatiotemporally located directly in front of the mountain range object 204b, and a portion (e.g., a head and/or neck) of the stick person 206b is partially occluding a viewing angle of the mountain range 206b.

The motion estimation engine 106 computes (e.g., interpolates) one or more motion vectors of one or more objects (e.g., the mountain range object 204a-204c and/or the stick person 206a-206c) of the scene depicted in the set of video frames that includes the frame 202. The motion estimation engine 106 can also assign a motion value associated with the one or more motion vectors of the one or more objects. The motion value may indicate a relative or scaled velocity or acceleration of an object, a boundary of the object, or a sparse feature point of the object. The color update engine 108 can use the interpolated motion to modify the pixel color information in a hole region corresponding to the stick person 206b in frame 202b.

For instance, the color update engine 108 can modify pixels within a hole region corresponding to the stick person 206b in frame 202b to have the color information from the identified pixels included in the mountain range object 204a-204c. By doing so, the color update engine 108 can generate a modified frame, e.g., the third frame 202c. The third frame 202c can be modified to optionally replace the stick person 206b of the second frame 206b with one or more background objects (e.g., removing the stick person 206b). Furthermore, in a modified third frame 202c, a hole region can been modified to depict other objects in the scene that were previously occluded by the stick figure and therefore not depicted in a frame (e.g., the mountain range 204b of the second frame 202b).

However, in the example of FIG. 2, the video editor 102 generates a modified frame 202c using interpolation of a movement of a camera angle and/or of the stick person 206b without any motion constraints. As a result, the mountain range 204c appears askew the modified frame 202c. As mentioned above, using interpolative data, e.g., one or more boundary points associated with a target object (e.g., the stick person 206b), without any sparse feature points (e.g., three-dimensional feature points within a reference object such as a three-dimensional feature of the mountain range 204a-204b) can result in geometric distortion. As mentioned above, geometric distortions can include parallax effects, pulling effects, perspective distortions, warping, axial rotations, radial distortions, asymmetries, etc. In this example, the mountain range 204 is axially rotated, compressed, and has a distanced perspective.

Figure 3:
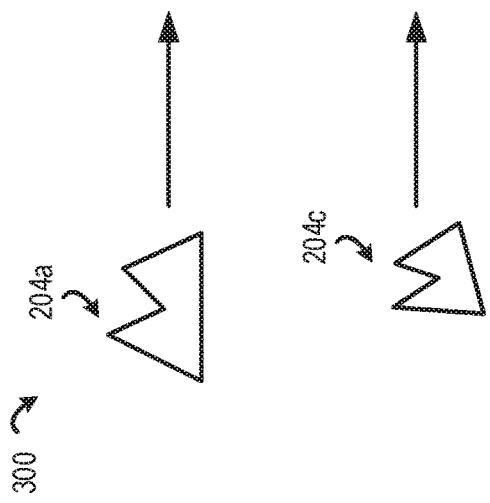
FIG. 3 depicts an example of generating feature points from a background reference object in the video in the video of FIG. 2, according to certain aspects of this disclosure.

FIG. 3 depicts an example 300 of generating feature points from a background reference object in the video in the video of FIG. 2, according to certain aspects of this disclosure. More specifically, the example 300 depicts an SfM process that can be used to obtain feature points of the mountain range 204a-204c depicted in FIG. 1, according to certain aspects of this disclosure. In this example, the video editor 102 uses the SfM engine 110 to identify features points associated with the mountain range 204a and 204c to generate a set of feature points depicted in the plot 302. For instance, the SfM engine 110 or other suitable software could receive the set of video frames 202a-202c in a native temporal sequential order and perform a 3D reconstruction forward (e.g., in the received sequential order. In additional or alternative aspects, the SfM engine 110 could receive the set of video frames 202a-202c in sequential order and perform a 3D reconstruction backwards (e.g., in a reverse temporal order).

In this example, the SfM engine 110 annotates the first frame 202a to specify that the first frame 202a is a reference frame and the mountain range 204a is a reference object. The SfM engine 110 can also annotate the reference frame 202a or the reference object, e.g., the mountain range 204b, to indicate that the reference object is partially occluded in the second frame 202b. Similarly, the SfM engine 110 can annotate the third frame 202c to indicate that the reference object includes a different axis of rotation, an amount of compression, an increase in a perspective distance, or another feature point discussed herein. In some aspects, the SfM engine 110 can detect changes in the reference object by, e.g., comparing features associated with mountain range 204a to those of the mountain range 204c. In this example, the SfM engine 110 can identify and store each of the 3D reconstructed features points of the mountain range 204a and 204c to generate a set of feature points depicted in the plot 302.

Figure 4:
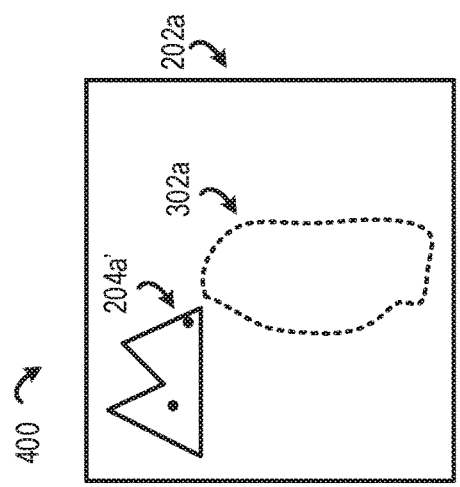
FIG. 4 depicts an example of the video from FIG. 2 with a target region that has been annotated, according to certain aspects of this disclosure.
Figure 4:
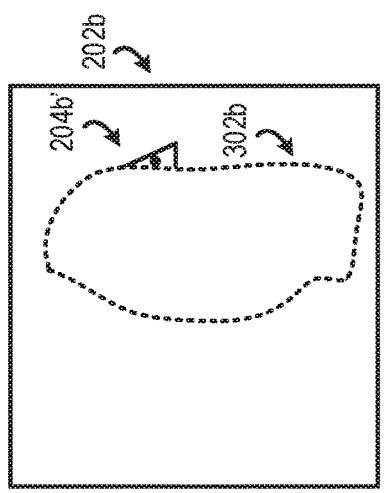
Figure 4:
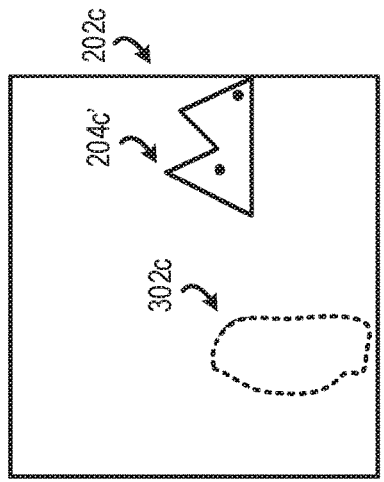

FIG. 4 depicts an example 400 of the video from FIG. 2 with a target region that has been annotated, according to certain aspects of this disclosure. The example 400 depicts an example of a target region associated with the video 200 that can be modified using the video editing environment 100, according to certain aspects of this disclosure. In this example, the video editor 102 identifies, based on one or more inputs from the input device 128, a target object (e.g., a stick person 206a-206c) is to be removed from the scene. In some aspects, the video editor 102 receives a user input, via the input device 128, that indicates the stick person 206a-206c is to be removed from the set of frames 202a-202c. However, in some aspects, the video editor 102 can receives one or more automated inputs that indicates another target object (e.g., an artifact, lint, dust, a visual distortion, a scratch mark on a lens, etc.) is to be removed from the set of frames 202a-202c.

In some aspects, a user input may include tracing or outline a portion of a particular frame (e.g., the first frame 202a) corresponding to a target object (e.g., the stick person 206a). In additional or alternative aspects, the user input can indicate a location corresponding to the target object to be removed. Having received a location associated with a target object, the video editor 102 or another suitable program code may automatically select, auto-trace, encapsulate, quantize, vectorize, highlight, or otherwise identify a target region corresponding to the target object, e.g., the stick person 206a. In this example, the video editor 102 traces the target object by circumscribing the stick person 206a-206c to generate a target region 302a-302c.

Continuing with this example, the target region 302a-302c encompasses a portion of each frame, in the set of frames 202a-202c, that further occludes one or more background images within the respective frames. For instance, the target region 302b that corresponds to a previous location associated with the target object, stick person 206b, further occludes the mountain range 204b'. But in this example 400, the video editor 102 selects a subset of the feature points as data points (e.g., sparse feature points) associated with the mountain range 204a'-204c,' to ensure its structural integrity. The video editor 102 can use these sparse feature points to correct distortions in a geometric shape or color of the mountain range 204c'. Thus, the video editor 102 can annotate the target region 302a-302c, correcting otherwise visually distorted background objects (e.g., mountain range 204c of FIG. 2) and avoiding the axial rotation, compression, and distanced perspective discussed above.

Figure 5:
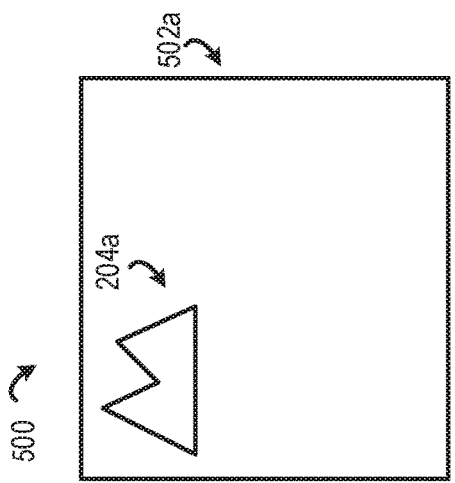
FIG. 5 depicts an example of the video from FIG. 2 with a target region that has been inpainted, according to certain aspects of this disclosure.
Figure 5:
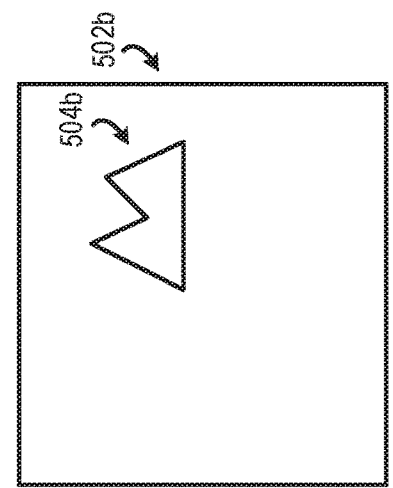
Figure 5:
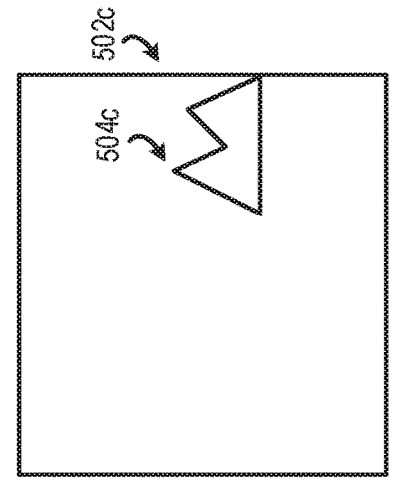

FIG. 5 depicts an example 500 of the video 200 from FIG. 2 with a target region that has been inpainted. This example 500 of the video 200 can be modified using the video editing environment 100 according to certain aspects of this disclosure. In the example 500 of FIG. 5, the video editor 102 has interpolated an estimated target motion of a target object, the stick person 206a-206c across the set of video frames 202a-202c in FIG. 2. The video editor 102 has also obtained feature points associated with a reference object, the mountain ranges 204a-204c, from a 3D reconstruction performed by the SfM engine 110 in FIG. 3. The video editor 102 has now received the identification of the target region 302a-302c from the user input discussed in FIG. 4. In the example 500, the video editor 102 infills the target region 302a-302c according to one or more modifications to generate modified video frames 502a-502c.

For instance, the video editor 102 can receive a user input of a particular reference frame, e.g., frame 202a of FIG. 2, with instructions to infill the target region 302a-302c of the set of video frames 202a-202c, with one or more background objects (e.g., one or more reference objects). In this example, the modifications also include the selection of the reference object, the mountain range 204a, to infill the corresponding portions within the target region 302a-302c of the video frames 202a-202c. The video editor 102 can use the interpolated target motion of the stick person 206a-206c provided by the motion estimation engine 106, the extrapolated (e.g., detected pixel values, pixel locations, or both for a depicted object) sparse feature points of the mountain range 204a'-204c' provided by the SfM engine 110, and the identified target region 302a-302c to infill pixel locations corresponding to target pixels within the target region 302a-302c. For example, the video editor 102 may employ the color update engine 108 to assign pixel values to pixel locations corresponding to the target region 302b and the occluded reference object, mountain range 204b' from FIG. 4.

In this example, the color update engine 108 assigns pixel values, using the sparse feature points and one or more boundary points of the target region 302b of FIG. 4, to generate the modified video frames 502a-502c. The color update engine 108 can determine that the user-selected target region 302a of FIG. 4 does not occlude or otherwise distort the reference object, mountain range 204a. Thus, the color update engine 108 copies the mountain range 204a from the frame 202a. However, the color update engine 108 determines the mountain range 204b is partially occluded by the target region 302b of FIG. 4, and thus, uses the visible sparse feature point within the mountain range 204b' to infill the corresponding portion of the target region 302b. In some aspects, the color update engine 108 can compare a color map of the mountain range 204b' to another of the mountain range 204a' to obtain one or more spatiotemporal relationships between one or more target pixel locations within the target region 302b. In some aspects, the color update engine 108 can obtain these color maps from the SfM engine 110. In this example, the color update engine 108 uses these spatiotemporal relationships to generate modified frames 502a-502c having a copied mountain range 204a and a modified mountain range 504b-504c.

Example of Using Reference Data for Video Inpainting of a Target Region

FIGS. 6-9 depict a simplified example of a video editor 102 being used to modify a target region to include content from a reference frame. In this example, the video editor 102 can estimate motion within a target region using the motion at one or more boundary points of the target region (e.g., a hole region within a particular video frame or set of video frames). To do so, the video editor 102 can compute optical-flow motion for each frame in a set of video frames. This computed motion can be used, for example, to remove a certain object from a scene by keeping track of the movement of other objects depicted behind the object to be removed. Keeping track of the movement of these other objects can facilitate updating a target region with color information from suitable pixels (e.g., pixels depicting the other objects in the scene).

In the simplified example of FIGS. 6-9, a video editor 102 accesses a set of video frames 122a-122c that are depicted in FIG. 5. Video content, which includes the video frames 122a-122c, is annotated to identify a target region. For instance, the target region 606a-606c in the video frame 122a could indicate that a particular object (e.g., the stick person 206a-206c of FIG. 2) is to be removed, and the target regions 306b and 306c in the video frames 122b and 122c, respectively, could indicate that the same object, positioned at a different location within the scene as depicted in the video frames 122b and 122c, is to be removed.

Figure 6:
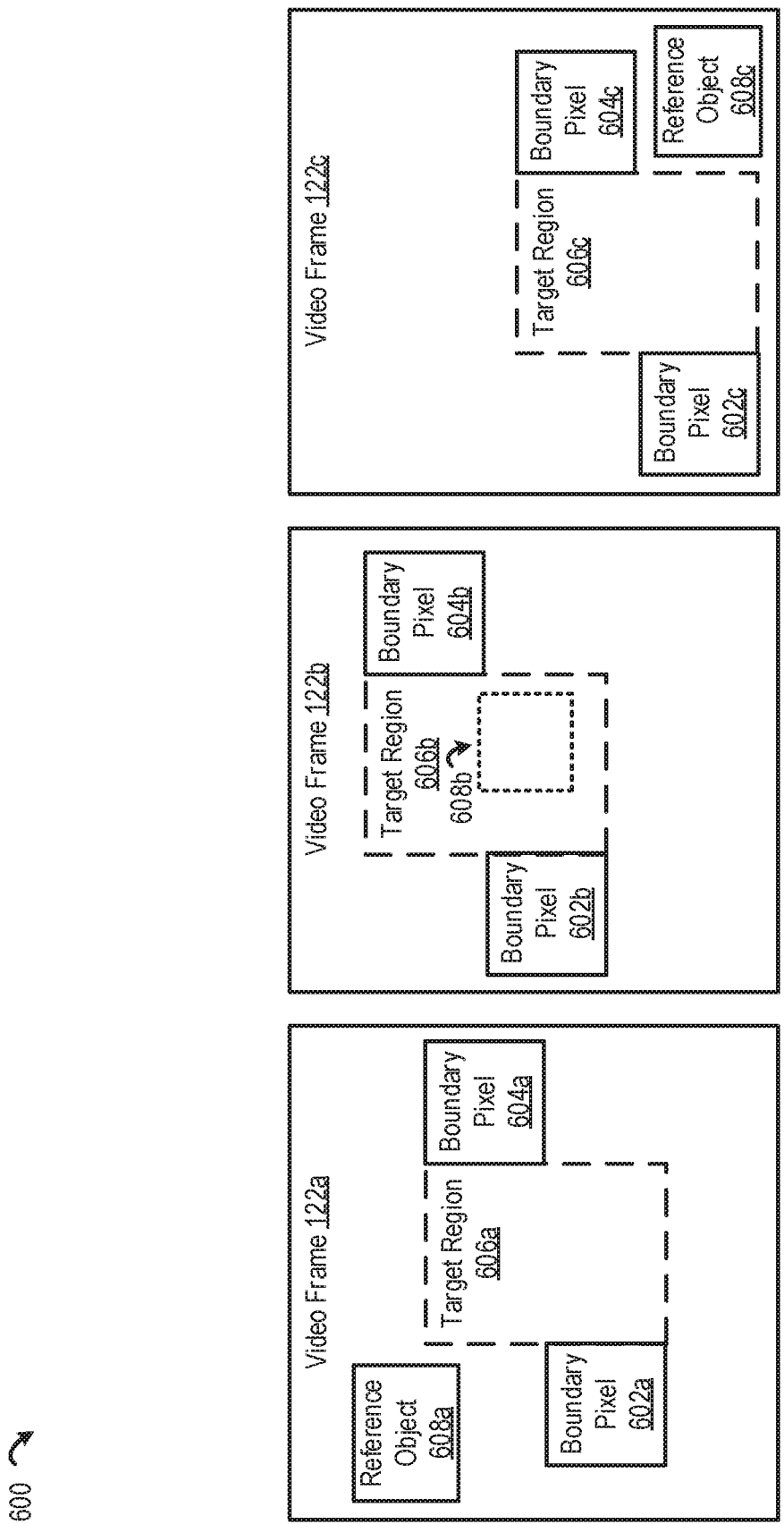
FIG. 6 depicts an example of a set of video frames having a target region, associated boundary pixels, and a background reference object that can be edited with the video processing environment depicted in FIG. 1, according to certain aspects of this disclosure.

The target region 606a-606c is bounded by a set of boundary pixels, 602a-602c and 604a-604c. In FIG. 6, the boundary includes the boundary pixels 602a and 604a on opposite sides of the target region 606a in video frame 122a. In one example, the boundary pixel 602a could be part of a tree depicted in the video frames 202a-202c of FIG. 2, the target region 606a could encompass the stick person 206a-206c depicted in the frames of FIG. 2, and the boundary pixel 604a could be part of a fence depicted in the video frames 202a-202c of FIG. 2. Similarly, in the video frame 122b, the boundary includes the boundary pixels 602b and 604b (e.g., pixels from the abovementioned tree and fence, having different spatiotemporal locations based on one or more motion vectors associated with a particular camera movement). The boundary pixels 602b and 604b are on opposite sides of the target region 606b (e.g., the target object, the stick person 206a-206c of FIG. 2, having a different spatiotemporal location), in the video frame 122b, the boundary points include the boundary pixels 602c and 604c (e.g., pixels from the tree and the fence in FIG. 2 at different locations) on opposite sides of the target region 606c (e.g., the target object of the stick person 206a-206c of FIG. 2 at a different location).

In one example, the video editor 102 updates the color data in a target region 606c as a function of one or more sparse feature points (e.g., reference pixel) corresponding to 3D feature points of a reference object (e.g., reference object 608a). In some aspects, the reference object 608a can be obtained from a user-specified reference frame (e.g., reference frame 118). The video editor 102 can generate a constraints for a video frame (e.g., video frame 122c) by applying the color data obtained from the sparse feature points of reference object 608a within a constrained target region (e.g., target region 606c). In this example, reference object 608b is occluded by a motion associated with target region 606b (e.g., a hole region) in the video frame 122b.

In this example, the video editor 102 uses the sparse feature points of the reference object 608a (e.g., assigned pixel values, pixel locations, axes of rotation, relative size, etc.) to generate a set of motion constraints associated with the reference object 608b. The video editor 102 can generate the reference object 608b based on an interpolated motion of the target region 606b. In some aspects, the video editor 102 can use the motion estimation engine 106 to determine a motion vector of the target regions 606a and 606c. The video editor 102 can use the motion vector to interpolate a relative location of occluded reference object 608b. Thus, when infilling the target region 606b, the video editor can reproduce an accurate representation (e.g., conforming with a ground true perspective) of the reference object 608b based on the motion constraints obtained from the sparse feature points, while also having an interpolated relative location of the reference object 608b within the target region.

Figure 7:
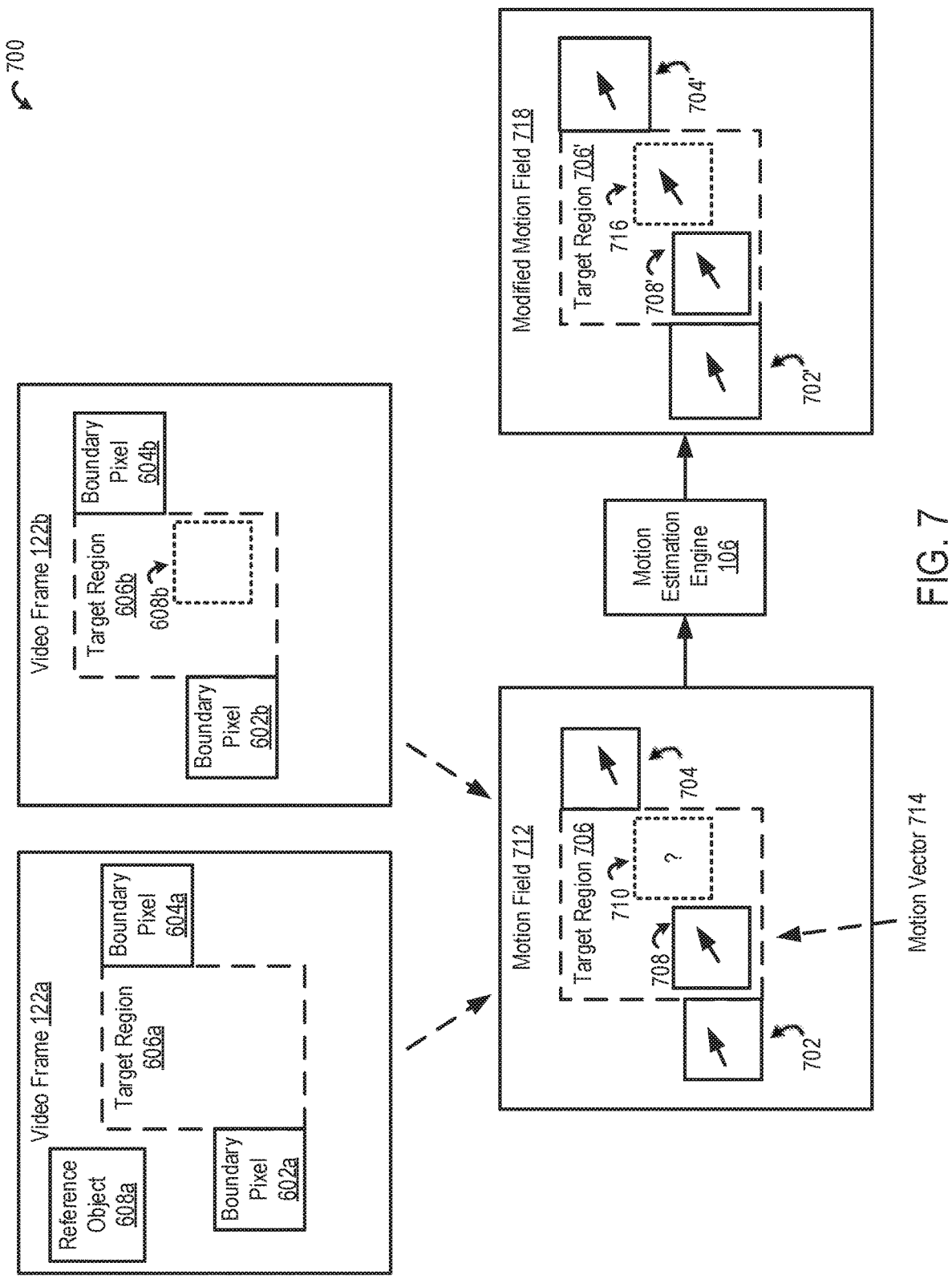
FIG. 7 depicts an example of a first motion field that is computed from the set of the video frames depicted in FIG. 6, according to certain aspects of this disclosure.

FIG. 7 depicts a simplified example of interpolating motion within a target region based on boundary pixels. In this example, the video editor 102 computes a motion field 712 based on an analysis of the video frame 122a and the video frame 122b. The video editor 102 represents the motion between boundary pixels 602a and 602b as a vector 702. The video editor 102 also represents the motion between boundary pixels 604a and 604b as a vector 704. For illustrative purposes, the vectors 702 and 704 are depicted in FIG. 7 using arrows identifying the directions of movement between boundary pixels 602a and 602b and between boundary pixels 604a and 604b. Furthermore, because the target region 606a identifies a location of a target object to be removed from the video frames 122a and 122b, the motion field 712 is depicted as including an "unknown" motion 710 for a target pixel within the target region 706, where the target region 706 indicates motion for a target object to be removed from the video frame 122a. In this example, the "unknown" motion 710 is an unknown desired motion (e.g., having a motion vector 714), e.g., the motion (e.g., having a ground true motion vector 708) that would have been computed in the target region if the video frames 122a and 122b had been captured without the target object that is to be removed.

The motion estimation engine 106 computes, based on the boundary motion, an estimated motion with respect the target region 706. For instance, each boundary pixel is associated with a respective boundary motion represented by a vector, such as the vectors 702 and 704. The motion estimation engine 106 uses the collection of vectors (including vectors 702 and 704) to compute an estimated motion for a target pixel within the target region 706. The motion estimation engine 106 generates a modified motion field 718 that includes a motion vector 716 for the estimated motion (e.g., having a motion vector 708') in the target region 706', along with the vectors 702' and 704'. In this example, the target region 706' is the same portion of the modified motion field 718 as compared to the target region 706 in the motion field 712. Similarly, the vectors 702' and 704' in the modified motion field 718 are the same as the vectors 702 and 704 in the motion field 712.

Continuing with this example, the video editor 102 can use the estimated motion illustrated in FIGS. 6 and 7 to trace, through time, paths of pixels (or, more specifically, objects comprised by the pixels) between locations outside the target region to locations inside the target region. Doing so allows the video editor 102 to identify or determine the appearance of these pixels using video frames in which the pixels are not in the target region.

Figure 8:
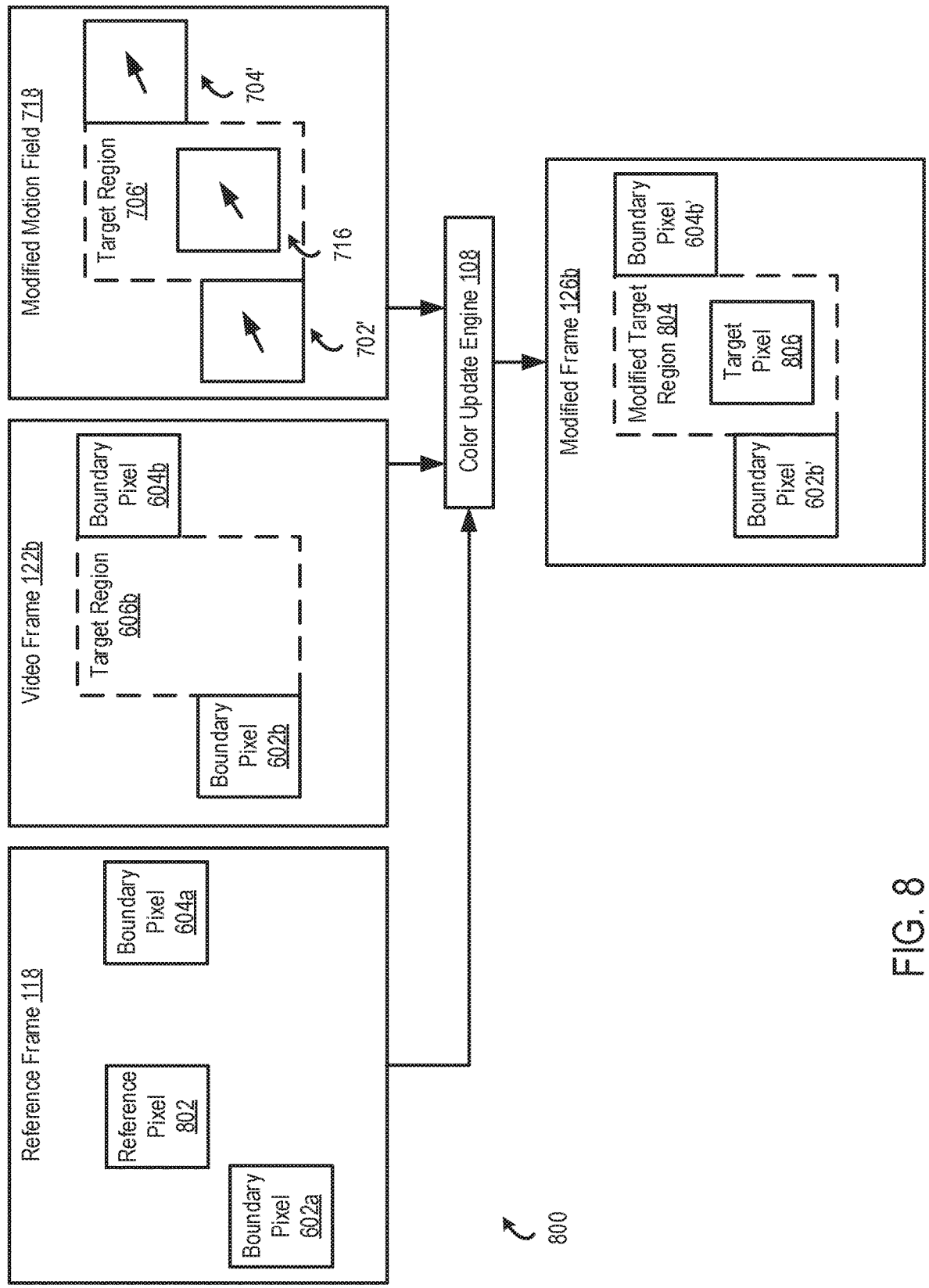
FIG. 8 depicts an example of propagating color information using the interpolated motion from the motion field from FIG. 7, according to certain aspects of this disclosure.

For instance, FIG. 8 depicts a simplified example of modifying color information of a target pixel 806 within a modified target region 118a based on an estimated motion computed by the motion estimation engine 106. In this example, the video editor 102 has been used to replace the video frame 122a with a reference frame 118. The reference frame 118 has some of the same content as the video frame 122a, such as boundary pixels 602a and 602b. But the reference frame 118 also includes one or more reference objects comprising reference pixels, where the reference objects have been created in the reference frame 118 via one or more user inputs. In this example, reference pixel 802 is one of these reference pixels included in a reference object.

The color update engine 108 accesses the reference frame 118, the video frame 122b, and the modified motion field 718. The color update engine 108 "traces" the path of a reference pixel 802 from a location in the reference frame 118 to a location within the target region 606b as depicted in the video frame 122b. Using the example of FIG. 2, a "traced" pixel could be a portion of a reference object, e.g., mountain range 204a-204c, that is occluded by the target object, e.g., the stick person 206a-206c, in the video frames 122a and 122b, but that a user has added to one or more reference frames 118.

A reference frame (e.g., reference frame 118) could be sequenced before one or more of the video frames 122a and 122b, sequenced after one or more of the video frames 122a and 122b, or both. In a simplified example, a pixel located at position (3, 1) in a reference frame 118 could have a brown color, e.g., be a part of the "brown fence" object. The motion vector 412 indicates the motion through the target region that would have been associated with the "brown fence" pixel if the "brown fence" object had not been occluded by target "stick person" object in the frames 122a and 122b. For instance, the motion vector 412 for this "fence" pixel could indicate a motion of one pixel up and three pixels right. The color update engine 108 can therefore determine that, in the absence of the occlusion by the "stick person" object, the "fence" pixel would have been located in the target region of the video frame 122b at position (4, 4) (e.g., one pixel up and three pixels right from the (3,1) location).

The color update engine 108 therefore copies color information from the pixel located at position (3,1) in the reference frame 118 (e.g., the "fence" pixel) to generate a target pixel 806 located at position (1,4) in the modified frame 126b. (In this illustrative example, the modified frame 126b also includes boundary pixels 602b' and 604b' that have the same color information as the boundary pixels 502b and 304b, respectively, from the video frame 122b.) In some aspects, the target pixel 806 can have identical color information as compared to the reference pixel 802. In additional or alternative aspects, the video editor 102 can modify the color information obtained from the reference pixel 802 when generating the target pixel 806. For instance, if the appearance of a reference object (e.g., the mountain range 204a-204c object) would change from the reference frame 118 to the video frame 122b (e.g., due to changes in view angle), the color update engine 108 can modify color information of pixels used to depict that reference object in the modified frame 126b. In one example, a scene as depicted in the reference frame 118 may include brighter colors to depict a more vibrant image.

Continuing with this example, the video editor 102 can use the estimated motion illustrated in FIGS. 6 and 7 and the color information of pixels in FIG. 8 to infill a constrained video. Doing so allows the video editor 102 to correct errors associated with a larger infilled target region to ensure a natural appearance of these pixels using video frames in which the pixels are not in the target region.

Figure 9:
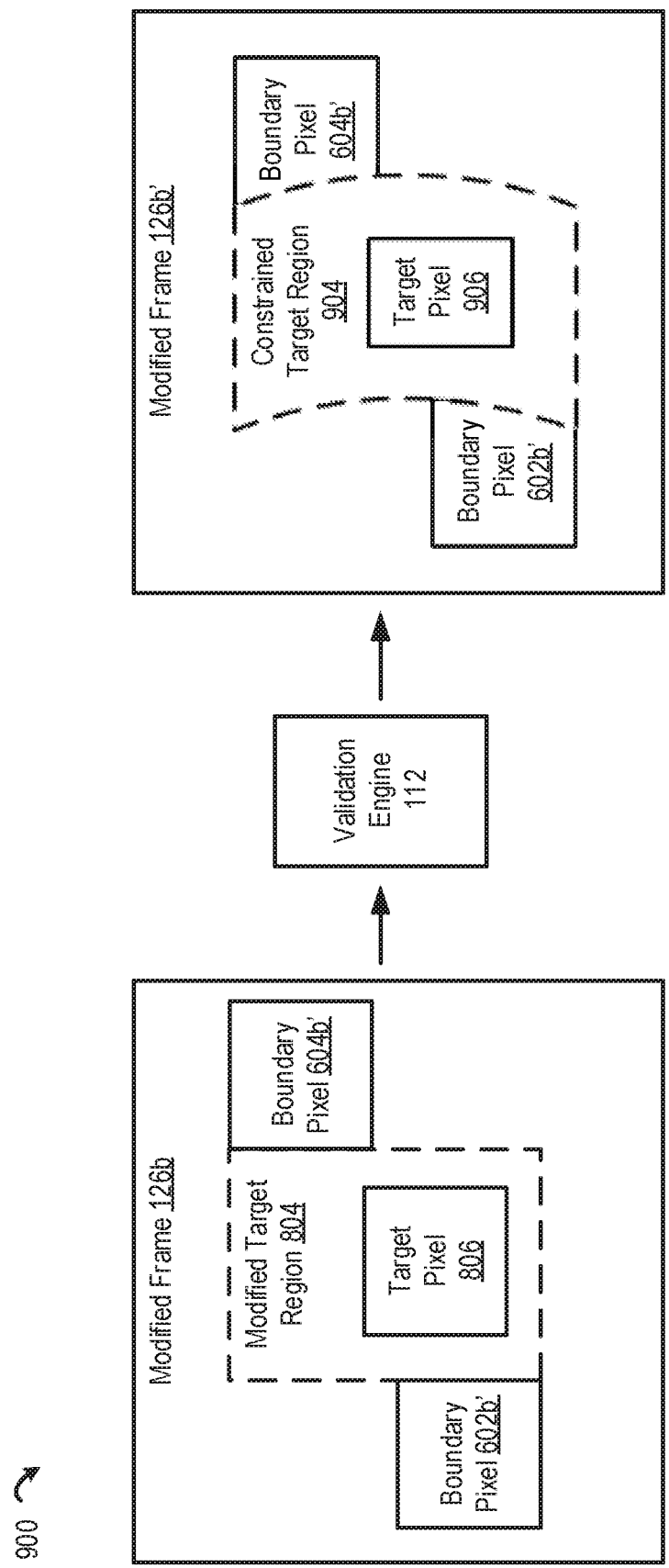
FIG. 9 depicts an example of generating a constrained, modified video frame using the interpolated motion from the motion field from FIG. 7 and the propagated color information of FIG. 8, according to certain aspects of this disclosure.

For instance, FIG. 9 depicts an example 900 of generating a constrained, modified video frame (e.g., modified frame 126b') using the interpolated motion from the motion field from FIG. 7 and the propagated color information of FIG. 8, according to certain aspects of this disclosure. In this example, the video editor 102 obtains sparse feature points from one or more reference pixels 802 of the reference frame 118 of FIG. 8. The video editor 102 verifies the resulting modified frame 126b produced by combination of the motion estimation engine 106 from FIG. 7 and the color update engine 108 from FIG. 8. For instance, the video editor 102 may employ the validation engine 112 to verify the accuracy of one or more features of the infilled image depicted in the modified frame 126b of FIG. 8. In some aspects, the validation engine 112 can obtain user-selected sparse feature points to ensure the accuracy of an infilled region corresponding to the modified target region 804, the target pixel 806, or both. In one example, the validation engine 112 can use sparse feature points generated by the SfM engine 110 to perform the verification. Other examples of the sparse feature points include be a randomly selected set of user-selected feature points, a randomly generated set of sparse feature points, or some combination thereof. The validation engine 112 can validate updated color information (e.g., pixel values or other color data) of the modified target region 804 based on the set or subset of sparse feature points. For instance, the validation engine 112 can re-compute color data of the modified target region 804 across the set of video frames in a forward temporal order or a reverse temporal order. In this example, the validation engine 112 re-computes color data of the modified target region 804 to generate a constrained target region 904 in the modified frame 126b' subject to the constraints of the sparse feature points.

In some aspects, the video editor 102 or other suitable program code (e.g., validation engine 112) can re-assign pixel values corresponding to one or more incongruent spatiotemporal relationships. For instance, the validation engine 112 may determine that the modified target region 804 and/or target pixel 806 do not accurately convey a ground true perspective (e.g., one or more geometric shapes). The validation engine 112 can correct the inaccurately generated video frame(s) by changing one or more pixel values within the modified target region 804, e.g., target pixel 806. In this example, the validation engine 112 alters a single pixel value to correct for a first visual distortion associated with the target pixel 806 to generate a target pixel 906 subject to a motion constraint (e.g., a sparse feature point from the one or more reference pixels 802). Similarly, the validation engine 112 alters pixel values to correct for a second visual distortion associated with the modified target region 804 to generate the constrained target region 904 in the modified frame 126b'. The video editor 102 or other suitable program code may be configured to generate corrective measures to constrain inaccurate results according to any of the techniques discussed herein.

Examples of Processes for Video Inpainting with a User-Provided Reference Frame

Figure 10:
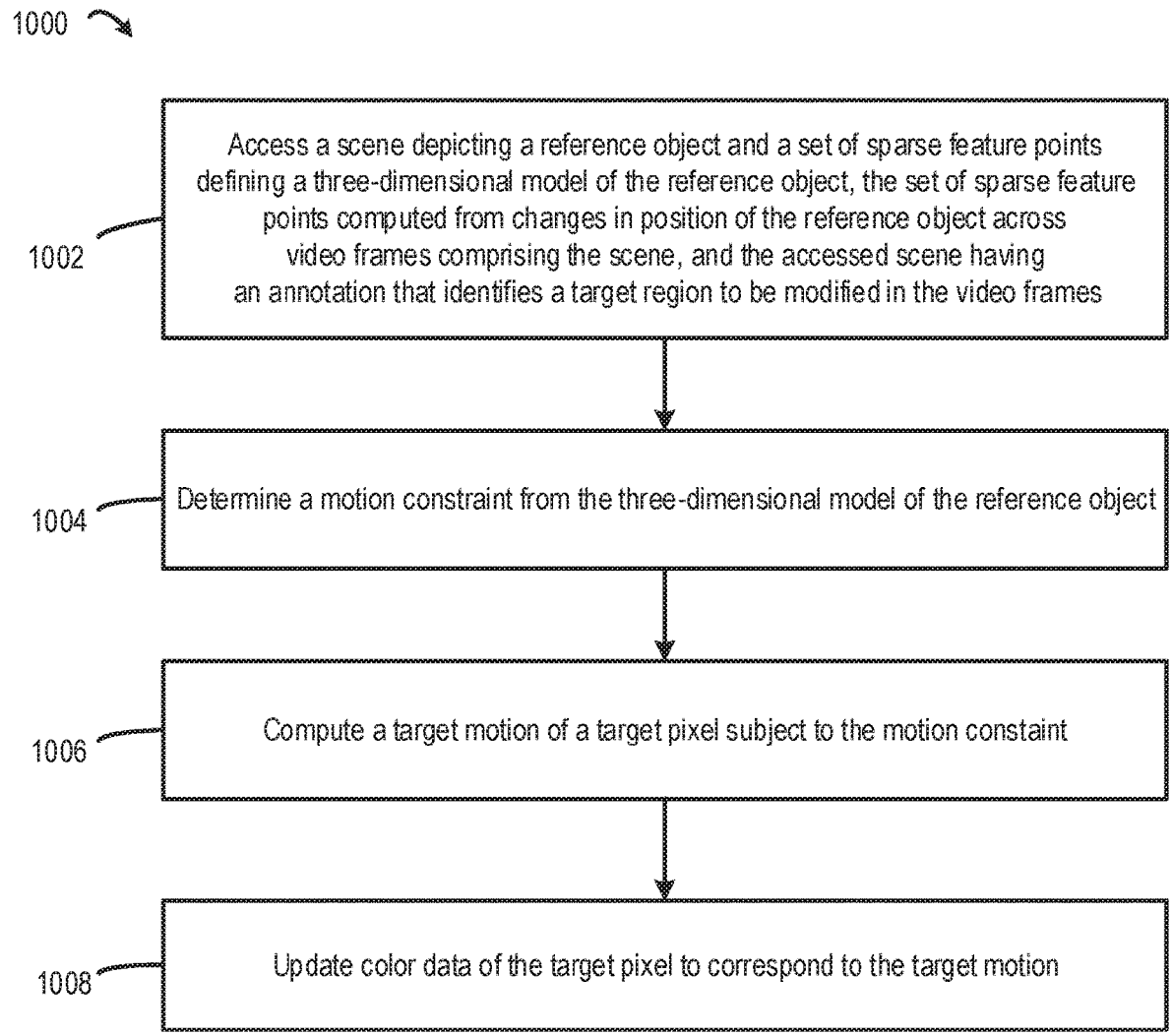
FIG. 10 depicts an example of a process for video inpainting using machine-learning models having motion constraints, according to certain aspects of this disclosure.

FIG. 10 depicts an example of a process 1000 for performing video inpainting using machine-learning models having motion constraints, according to certain aspects of this disclosure. One or more operations described with respect to FIG. 10 can be used to implement a step for modifying color data of a target pixel within a target region of the scene based on a target motion of the target pixel within the target region subject to a motion constraint defined by a set of sparse feature points. In some aspects, one or more computing devices implement operations depicted in FIG. 10 by executing suitable program code (e.g., the video editor 102, one or more of the engines depicted in FIG. 1, etc.). For illustrative purposes, the process 1000 is described with reference to certain examples depicted in the figures. Other implementations, however, are possible.

At block 1002, the process 1000 involves accessing a scene that includes video frames depicting a reference object and a set of sparse feature points defining a three-dimensional model of the reference object. As discussed above, a set of sparse feature points can be computed from changes in position of the reference object across video frames that comprise the scene. The scene accessed at block 1002 can have an annotation (e.g., annotation 120) that identifies a target region to be modified in the video frames. For instance, the video editor 102 can access video content from a data storage unit. The data storage unit can be located on one or more memory devices available over a data network, one or more memory devices connected to a data bus on a computing device that executes the video editor 102, or some combination thereof.

In one example, the video editor 102 accesses video content having one or more annotated target regions. Examples of an annotated target region include a hole generated by one or more erasure inputs received via the input device 128, a particular target object to be replaced (e.g., the stick figure depicted in FIG. 2) that is identified by one or more selection inputs received via the input device 128 as a particular target object to be modified (e.g., modifying the appearance of a target object rather than removing the target object) that is identified by one or more selection inputs received via the input device 128, a dark area in the scene generated by dust on the lens of a camera used to capture the scene, or a shadow to be removed. The video editor 102 can be used to modify some or all pixels in the hole with color values. For instance, if an object is to be removed or a hole to be filled, the video editor 102 can be used to modify target pixels (e.g., target pixel 806) in the target region to have color information that would have resulted from capturing the scene without the object.

In some aspects, interpolating a first target motion of target pixels within the target region from the boundary motion. For instance, the motion estimation engine 106 generates a modified motion field for a specific video frame (e.g., estimates the motion of a pixel in the target region of a specific frame) as a spatiotemporal function of the motion of the boundary pixels at the boundary of the target region.

In some aspects, the video editor 102 can compute a boundary motion for one or more boundary points associated with a target region indicated by an annotation (e.g., annotation 120) associated with the scene. The video editor 102 can compute an optical flow with respect to a set of video frames that collectively depicts a scene. For instance, the video frames can be included in an input video I of height H, width W and number of frames L. The video editor 102 can compute a forward flow U and a backward flow V. To compute the motion between frame n and n+1, the video editor 102 can compute the flow (motion) from time n to time n+1. The forward flow at position (x, y, n) (e.g., a pixel at position (x, y) on a frame at time n) can be represented as U (x, y, n)=(dx, dy, +1), indicating a flow vector (dx, dy) from a point located at (x, y, n) to a point (x+dx, y+dy, n+1) in the video I. The backward flow at position (x, y, n) (e.g., a pixel at position (x, y) on frame n) can be represented as V (x, y, f)=(dx, dy, −1).

In some aspects, a boundary motion may include a motion with respect to one or more pixels that define a boundary of a target region. The boundary can be, for example, the set of pixels that neighbor the union of the hole in a video frame n and a video frame n+1. This set of boundary pixels can include pixels having some commonality with one another that are adjacent to at least one other pixel not sharing the commonality (e.g., two pixels that share at least some color information and that have no common color information with respect to an adjacent pixel in the target region).

At block 1004, the process 1000 involves determining a motion constraint from the three-dimensional model of the reference object. In one example, the video editor 102 extrapolates a set of sparse feature points corresponding to a target motion of the target pixels within the target region. For instance, the video editor 102 may receive one or more sparse feature points identified as 3D features points associated with the reference object. In some aspects, the SfM engine 110 may perform a 3D reconstruction of video frames to obtain one or more sparse feature points associated with the reference object. The video editor 102 generates a constrained, modified video frame based on the first target motion and the sparse feature points obtained from a user or from a SfM process. For instance, the video editor 102 can alter erroneous interpolative data within the modified motion field to correct geographic or pixel values that would otherwise cause visual distortion within the target region. In some aspects, the video editor 102 can propagate these corrective measures across the set of video frames as a spatiotemporal function of the motion of the boundary pixel locations at the boundary of the target region, sparse pixel locations corresponding to 3D feature points within the target region, or both.

At block 1006, the process 1000 involves computing a target motion of a target pixel to correspond to the target motion. For instance, the motion estimation engine 106 generates a modified motion field for a specific video frame (e.g., estimates the motion of a pixel in the target region of a specific frame) within the target region from the boundary motion. In one example, the motion estimation engine 106 computes the target motion as a function of the motion of the boundary pixels at the boundary of the target region. In another example, the motion estimation engine 106 computes the target motion as a function of both the motion of the boundary pixels and one or more motion constraints (e.g., a set of sparse feature points).

In some aspects, computing the target motion can involve inserting a reference frame having a modification into the set of video frames in response to an input. The video editor 102 can, for example, identify a reference frame 118 that has been provided to the video editor 102 via one or more inputs. The reference frame 118 can include one or more reference objects that have been created, with the one or more inputs, associated with the target region. The modification to the target region can include creating such reference objects. A reference object can include a set of one or more pixels (e.g., reference pixel 802), and reference pixels 802 can also include reference color data. As described below, the video editor 102 modifies the target region in one or more other video frames to include the reference color data from the reference frame 118.

At block 1008, the process 1000 involves updating color data of the target pixel 806 with color data from the reference frame 118 to correspond to the target motion interpolated from the boundary motion. For instance, the video editor 102 uses motion fields that have been modified with interpolated target motion of various pixels to trace paths of the pixels from a location within the target region to one or more locations outside the target region. For each pixel inside the target region in a given video frame, the video editor 102 copies (and, in some cases, further updates) the pixel data (e.g., color information) from a corresponding pixel that has been traced to another video frame, as described above with respect to FIGS. 5 and 7. In a simplified example, the color update engine 108 can identify reference color data of the target pixel 806 at a reference location in the reference frame 118. The color update engine 108 can update first color data of the target pixel 806 at a first location in the first frame by replacing the first color data with the reference color data. Replacing the first color data with the reference color data can include copying the reference color data, updating the copied reference color data to reflect one or more changes in the scene from the reference frame 118 to the first frame, and updating the target pixel 806 to have the updated reference color data. Similarly, the color update engine 108 can identify this color data of the target pixel 806 at the first location in the modified first frame. The color update engine 108 can update second color data of the target pixel 806 at a second location in the second frame by replacing the second color data with the identified color data of the target pixel 806 in the first frame. Here, replacing the second color data with the identified color data of the target pixel 806 in the first frame can include copying the color data of the target pixel 806 in the first frame, updating the copied color data to reflect one or more changes in the scene from the first frame to the second frame, and updating the target pixel 806 in the second frame to have this updated version of the color data of the target pixel 806 in the first frame.

Figure 11:
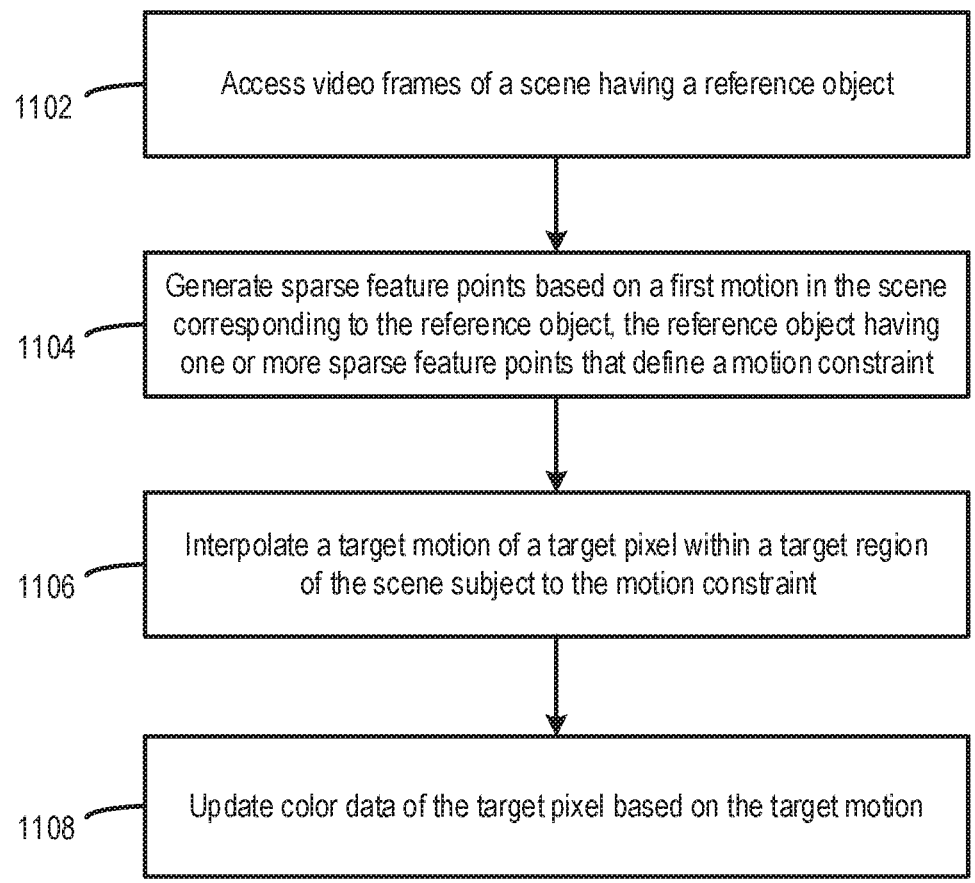
FIG. 11 depicts another example of a process for video inpainting using machine-learning models having motion constraints, according to certain aspects of this disclosure.

FIG. 11 depicts an example of a process 1100 for performing for video inpainting using machine-learning models having motion constraints, according to certain aspects of this disclosure. One or more operations described with respect to FIG. 11 can be used to implement a step for modifying color data of a target pixel within a target region of the scene based on a target motion of the target pixel within the target region subject to a motion constraint defined by a set of sparse feature points. In some aspects, one or more computing devices implement operations depicted in FIG. 11 by executing suitable program code (e.g., the video editor 102, one or more of the engines depicted in FIG. 1, etc.). For illustrative purposes, the process 1100 is described with reference to certain examples depicted in the figures. Other implementations, however, are possible.

At block 1102, the process 1100 involves accessing video frames of a scene having a reference object. For instance, the video editor 102 can access video content from a data storage unit. The data storage unit can be located on one or more memory devices available over a data network, one or more memory devices connected to a data bus on a computing device that executes the video editor 102, or some combination thereof.

In one example, the video editor 102 accesses video content having one or more annotated target regions. Examples of an annotated target region include a hole generated by one or more erasure inputs received via the input device 128, a particular target object to be replaced (e.g., the stick figure depicted in FIG. 2) that is identified by one or more selection inputs received via the input device 128 as a particular target object to be modified (e.g., modifying the appearance of a target object rather than removing the target object) that is identified by one or more selection inputs received via the input device 128, a dark area in the scene generated by dust on the lens of a camera used to capture the scene, or a shadow to be removed. The video editor 102 can be used to modify some or all pixels in the hole with color values. For instance, if an object is to be removed or a hole to be filled, the video editor 102 can be used to modify target pixels (e.g., target pixels 806, 906) in the target region to have color information that would have resulted from capturing the scene without the object.

At block 1104, the process 1100 involves interpolating a first target motion of target pixels within the target region from the boundary motion. For instance, the motion estimation engine 106 generates a modified motion field for a specific video frame (e.g., estimates the motion of a pixel in the target region of a specific frame) as a spatiotemporal function of the motion of the boundary pixels at the boundary of the target region.

At block 1106, the process 1100 involves interpolating a target motion of a target pixel within the target region of the scene subject to the motion constraint. For instance, the video editor 102 may receive one or more sparse feature points identified as 3D features points associated with the reference object. In some aspects, the SfM engine 110 may perform a 3D reconstruction of video frames to obtain one or more sparse feature points associated with the reference object. The video editor 102 generates a constrained, modified video frame based on the first target motion and the sparse feature points obtained from a user or from a SfM process. For instance, the video editor 102 can alter erroneous interpolative data within the modified motion field to correct geographic or pixel values that would otherwise cause visual distortion within the target region. In some aspects, the video editor 102 can propagate these corrective measures across the set of video frames as a spatiotemporal function of the motion of the boundary pixel locations at the boundary of the target region, sparse pixel locations corresponding to 3D feature points within the target region, or both.

In some aspects, the video editor 102 inserts a reference frame having a modification into the set of video frames in response to an input. The video editor 102 can, for example, identify a reference frame 118 that has been provided to the video editor 102 via one or more inputs. The reference frame 118 can include one or more reference objects that have been created, with the one or more inputs, associated with the target region. The modification to the target region can include creating such reference objects. A reference object is comprised of one or more pixels (e.g., reference pixel 802) that include reference color data. As described below, the video editor 102 modifies the target region in one or more other video frames to include the reference color data from the reference frame 118.

At block 1108, the process 1100 involves updating color data of the target pixel (e.g., target pixel 806) with color data from the reference frame 118 to correspond to the target motion interpolated from the boundary motion. For instance, the video editor 102 uses motion fields that have been modified with interpolated target motion of various pixels to trace paths of the pixels from a location within the target region to one or more locations outside the target region. For each pixel inside the target region in a given video frame, the video editor 102 copies (and, in some cases, further updates) the pixel data (e.g., color information) from a corresponding pixel that has been traced to another video frame, as described above with respect to FIGS. 5 and 7.

In a simplified example, the color update engine 108 can identify reference color data of the target pixel 806 at a reference location in the reference frame 118. The color update engine 108 can update first color data of the target pixel 806 at a first location in the first frame by replacing the first color data with the reference color data. Replacing the first color data with the reference color data can include copying the reference color data, updating the copied reference color data to reflect one or more changes in the scene from the reference frame 118 to the first frame, and updating the target pixel 806 to have the updated reference color data. Similarly, the color update engine 108 can identify this color data of the target pixel 806 at the first location in the modified first frame. The color update engine 108 can update second color data of the target pixel 806 at a second location in the second frame by replacing the second color data with the identified color data of the target pixel 806 in the first frame. Here, replacing the second color data with the identified color data of the target pixel 806 in the first frame can include copying the color data of the target pixel 806 in the first frame, updating the copied color data to reflect one or more changes in the scene from the first frame to the second frame, and updating the target pixel 806 in the second frame to have this updated version of the color data of the target pixel 806 (e.g., target pixel 906) in the first frame.

In one example, the video editor 102 updates the color data in a target pixel 906 as a function of one or more sparse feature points (e.g., reference pixel 802) corresponding to 3D feature points of a reference object (e.g., reference object 608a). In some aspects, the reference object 608a can be obtained from a user-specified reference frame (e.g., reference frame 118). The video editor 102 can generate a constrained video frame (e.g., the modified frame 126b') by applying the color data obtained from the sparse feature points (e.g., the reference pixel 802 or reference object 608a) within a constrained target region (e.g., constrained target region 904).

Updating color data can include any process in which video content, after being edited using the process 1100, displays one or more modifications to the target region after playback. In some aspects, updating color data involves modifying an image layer that includes the target object in the video frames. In additional or alternative aspects, updating color data involves overlaying one or more image layers with the modified target region and one or more image layers that include the unmodified target object in the video frames. In one example, the video editor 102 could create a set of video frames having a mask in the shape of the target region, where pixels outside the target region are set to be transparent and pixels within the target region are set to be opaque. The video editor 102 can update the opaque pixels of this image layer at block 1108. The video editor 102 can create a multi-layered set of frames in which the layer having opaque pixels depicting the modified target region and transparent pixels elsewhere is overlaid on a source layer that includes the video content with the unmodified target region. Any number of layers, with different configurations of masks, can be used to generate an output video having the modified target region.

Example of a Computing System for Implementing Certain Aspects

Figure 12:
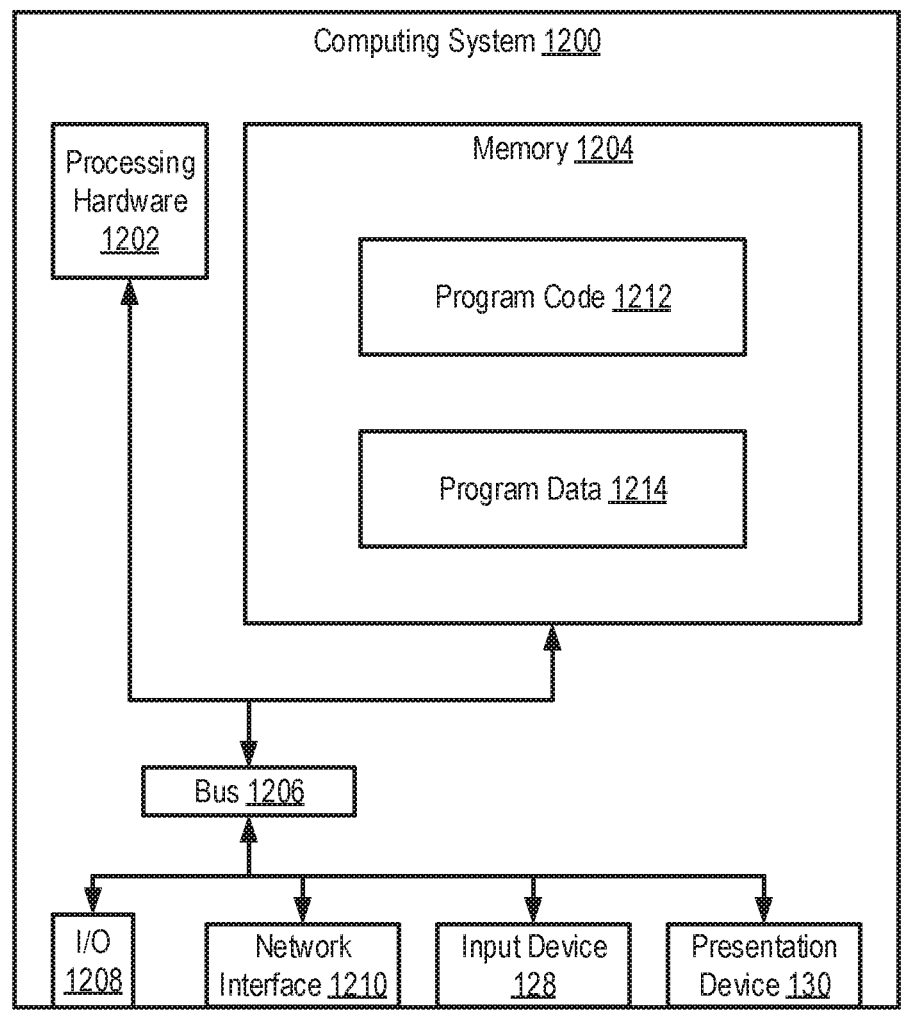
FIG. 12 depicts an example of a computing system for implementing one or more aspects of this disclosure.

Any suitable computing system or group of computing systems can be used for performing the operations described herein. For example, FIG. 12 depicts an example of a computing system 1200. In some aspects, the computing system 1200 includes processing hardware 1202 that executes program code 1212 (e.g., the video editor 102, the motion estimation engine 106, the color update engine 108, etc.), a memory device 1204 that stores one or more sets of program data 1214 computed or used by operations in the program code 1212 (e.g., a set of input video frames, annotations 120 identifying target regions, motion fields, a set of edited video frames, etc.), one or more input devices 128, and one or more presentation devices 130 for displaying graphical content generated by executing the program code 1212. For illustrative purposes, FIG. 12 depicts a single computing system on which the program code 1212 is executed, the program data 1214 is stored, and the input devices 128 and presentation device 130 are present. But various applications, datasets, and devices described can be stored or included across different computing systems having devices similar to the devices depicted in FIG. 12.

The depicted example of a computing system 1200 includes processing hardware 1202 communicatively coupled to one or more memory devices 1204. The processing hardware 1202 executes computer-executable program code stored in a memory device 1204, accesses information stored in the memory device 1204, or both. Examples of the processing hardware 1202 include a microprocessor, an application-specific integrated circuit ("ASIC"), a field-programmable gate array ("FPGA"), or any other suitable processing device. The processing hardware 1202 can include any number of processing devices, including a single processing device.

The memory device 1204 includes any suitable non-transitory computer-readable medium for storing data, program code, or both. A computer-readable medium can include any electronic, optical, magnetic, or other storage device capable of providing a processor with computer-readable instructions or other program code 1212. Non-limiting examples of a computer-readable medium include a magnetic disk, a memory chip, a ROM, a RAM, an ASIC, optical storage, magnetic tape or other magnetic storage, or any other medium from which a processing device can read instructions. The program code 1212 may include processor-specific instructions generated by a compiler or an interpreter from code written in any suitable computer-programming language, including, for example, C, C++, C#, Visual Basic, Java, Python, Perl, JavaScript, and ActionScript.

The computing system 1200 may also include a number of external or internal devices, such as an input device 128, a presentation device 130, or other input or output devices. For example, the computing system 1200 is shown with one or more input/output ("I/O") interfaces 1208. An I/O interface 1208 can receive input from input devices (e.g., input device 128) or provide output to output devices (e.g., presentation device 130). One or more buses 1206 are also included in the computing system 1200. The bus 1206 communicatively couples one or more components of a respective one of the computing system 1200.

The computing system 1200 executes program code 1212 that configures the processing hardware 1202 to perform one or more of the operations described herein. The program code 1212 includes, for example, the video editor 102, the motion estimation engine 106, the color update engine 108, or other suitable program code that performs one or more operations described herein. The program code 1212 may be resident in the memory device 1204 or any suitable computer-readable medium and may be executed by the processing hardware 1202 or any other suitable processor. The program code 1212 uses or generates program data 1214. Examples of the program data 1214 include one or more of the memory frames, ground truth frames, feature-classification data, feature-selection data, key or value maps, etc. described herein with respect to FIGS. 1-9.

In some aspects, the computing system 1200 also includes a network interface device 1210. The network interface device 1210 includes any device or group of devices suitable for establishing a wired or wireless data connection to one or more data networks. Non-limiting examples of the network interface device 1210 include an Ethernet network adapter, a modem, or the like. The computing system 1200 is able to communicate with one or more other computing devices via a data network using the network interface device 1210.

An input device 128 can include any device or group of devices suitable for receiving visual, auditory, or other suitable input that controls or affects the operations of the processing hardware 1202. Non-limiting examples of the input device 128 include a recording device, a touchscreen, a mouse, a keyboard, a microphone, a video camera, a separate mobile computing device, etc. A presentation device 130 can include any device or group of devices suitable for providing visual, auditory, or other suitable sensory output. Non-limiting examples of the presentation device 130 include a touchscreen, a monitor, a separate mobile computing device, etc.

Although FIG. 12 depicts the input device 128 and the presentation device 130 as being local to the computing device that executes the program code 1212, other implementations are possible. For instance, in some aspects, one or more of the input device 128 and the presentation device 130 can include a remote client-computing device that communicates with the computing system 1200 via the network interface device 1210 using one or more data networks described herein.

General Considerations

While the present subject matter has been described in detail with respect to specific aspects thereof, it will be appreciated that those skilled in the art, upon attaining an understanding of the foregoing, may readily produce alterations to, variations of, and equivalents to such aspects. Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter. Accordingly, the present disclosure has been presented for purposes of example rather than limitation, and does not preclude the inclusion of such modifications, variations, and/or additions to the present subject matter as would be readily apparent to one of ordinary skill in the art.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

Aspects of the methods disclosed herein may be performed in the operation of such computing devices. The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more aspects of the present subject matter. Any suitable programming, scripting, or other type of language or combinations of languages may be used to implement the teachings contained herein in software to be used in programming or configuring a computing device. The order of the blocks presented in the examples above can be varied—for example, blocks can be re-ordered, combined, and/or broken into sub-blocks. Certain blocks or processes can be performed in parallel.

The invention claimed is:

1. A method in which one or more processing devices performs operations comprising:
   accessing a scene depicting a reference object, the scene comprising video frames and an annotation identifying a target region to be modified in one or more of the video frames;
   accessing a set of sparse feature points defining a three-dimensional model of the reference object, wherein the set of sparse feature points are computed from changes in position of the reference object across the video frames due to motion of the reference object across the video frames;
   determining, from the three-dimensional model of the reference object, a motion constraint comprising a reference motion computed from the set of sparse feature points;
   computing a target motion of a target pixel of the target region, wherein the target motion is subject to the motion constraint, wherein the target region occludes, at least in part, the reference object, wherein computing the target motion of the target pixel comprises:
      identifying boundary pixels of the target region including a first boundary pixel and a second boundary pixel on an opposite side of the target region from the first boundary pixel;
      determining, across the video frames, a first boundary motion of the first boundary pixel and a second boundary motion of the second boundary pixel, wherein the target motion of the target pixel is determined based on the first boundary motion of the first boundary pixel and the second boundary motion of the second boundary pixel; and
   updating color data of the target pixel based on the target motion.

2. The method of claim 1, the operations further comprising computing the set of sparse feature points by at least executing a structure from motion process that computes, from the video frames, the three-dimensional model of the reference object.

3. The method of claim 1, wherein determining the motion constraint comprises identifying a motion of the reference object through the target region that is consistent with the three-dimensional model derived from changes to a relative position of the reference object across the video frames.

4. The method of claim 1, wherein computing the target motion of the target pixel subject to the motion constraint comprises:
   accessing a video frame in which the target region occludes the reference object;
   specifying a first motion value for a first sub-region within the target region to the target motion; and
   applying, to the video frames, a machine-learning model that estimates a second motion value for a second sub-region within the target region based on both the specified first motion value and a boundary motion for the target region.

5. The method of claim 1, wherein the motion constraint is a first motion constraint, the operations further comprising:
   obtaining one or more user-specified sparse feature points, the one or more user-specified sparse feature points further defining the three-dimensional model of the reference object;
   determining, from the three-dimensional model of the reference object, a second motion constraint based at least in part on the one or more user-specified sparse feature points; and
   re-computing the target motion of the target pixel subject to the first motion constraint and the second motion constraint.

6. The method of claim 1, wherein the target region comprises an object to be removed or modified.

7. A computing system comprising:
   a processing device; and
   a non-transitory computer-readable medium communicatively coupled to the processing device and storing program code, the processing device configured to execute the program code and thereby performing operations comprising:
      accessing a set of video frames depicting a scene, the scene comprising a reference object;
      generating a set of sparse feature points based on a first motion of the reference object across the video frames depicting the scene, the set of sparse feature points comprising one or more sparse feature points corresponding to the reference object, wherein the one or more sparse feature points define a motion constraint comprising a reference motion;
      interpolating a target motion of a target pixel within a target region of the scene, wherein the target motion is subject to the motion constraint, wherein the target region occludes, at least in part, the reference object, wherein computing the target motion of the target pixel comprises:
         identifying boundary pixels of the target region including a first boundary pixel and a second boundary pixel on an opposite side of the target region from the first boundary pixel;
         determining, across the video frames, a first boundary motion of the first boundary pixel and a second boundary motion of the second boundary pixel, wherein the target motion of the target pixel is determined based on the first boundary motion of the first boundary pixel and the second boundary motion of the second boundary pixel;
      updating color data of the target pixel based on the target motion.

8. The computing system of claim 7, wherein the operations further comprise:
   computing the set of sparse feature points by executing a structure from motion process that generates a three-dimensional reconstruction of the reference object, the three-dimensional reconstruction of the reference object comprising a three-dimensional pixel map.

9. The computing system of claim 7, wherein the target motion is a first target motion, the target pixel is a first target pixel, the target region comprises a boundary point, and wherein the operations further comprise:
   accessing a video frame of the set of video frames, the video frame comprising the reference object, wherein the reference object is partially occluded by a sub-region of the target region in the video frame; and interpolating a second target motion of a second target pixel within the target region of the scene, the second target motion corresponding to the sub-region of the target region, wherein the second target motion based at least in part on at least on both the first target motion and the boundary point of the target region.

10. The computing system of claim 7, wherein the motion constraint is configured to provide a pixel value of the target pixel, and wherein the operations further comprise:
determining the motion constraint by identifying a motion vector of the reference object through the target region, the motion vector being derived from spatiotemporal changes to the reference object across the set of video frames; and
updating the color data of the target pixel by changing a pixel value of the target pixel based at least in part on the motion constraint.

11. The computing system of claim 7, wherein the operations further comprise:
receiving a user input comprising at least one sparse feature point corresponding to the reference object; and
updating the set of sparse feature points based on the user input.

12. The computing system of claim 11, wherein the motion constraint is a first motion constraint, and wherein the operations further comprise:
determining a second motion constraint based at least in part on the user input; and
re-computing the target motion of the target pixel subject to the first motion constraint and the second motion constraint.

13. The computing system of claim 7, wherein the operations further comprise:
obtaining a subset of sparse feature points, the subset of sparse feature points being randomly selected or user-selected; and
validating the updated color data of the target region based on the subset of sparse feature points by re-computing the color data of the target region across a subset of the set of video frames in a forward temporal order or a reverse temporal order.

14. The computing system of claim 7, wherein the target region comprises an object to be removed or modified.

15. A non-transitory computer-readable medium having program code of a video editing tool stored thereon, wherein the program code, when executed by one or more processing devices, configures the one or more processing devices to perform operations comprising:
accessing a scene depicting a reference object and a set of sparse feature points corresponding to features that define a model of the reference object, wherein the set of sparse feature points are generated from changes in relative positions across the video frames of the features that define the model of the reference object, wherein the changes in relative positions of the features is due to motion of the reference object across the video frames, wherein the set sparse feature points comprises one or more two-dimensional feature points or three-dimensional feature points, and wherein the accessed scene has an annotation identifying a target region to be modified in one or more of the video frames;
determining, based on the model of the reference object, a motion constraint comprising a reference motion computed from the set of sparse feature points;
computing a target motion of a target pixel subject to the motion constraint, wherein the target region occludes, at least in part, the reference object, wherein computing the target motion of the target pixel comprises:
identifying boundary pixels of the target region including a first boundary pixel and a second boundary pixel on an opposite side of the target region from the first boundary pixel;
determining, across the video frames, a first boundary motion of the first boundary pixel and a second boundary motion of the second boundary pixel, wherein the target motion of the target pixel is determined based on the first boundary motion of the first boundary pixel and the second boundary motion of the second boundary pixel; and
updating color data of the target pixel to correspond to the target motion.

16. The non-transitory computer-readable medium of claim 15, wherein the motion constraint is a first motion constraint, and wherein the operations further comprise:
obtaining one or more user-specified sparse feature points, the one or more user-specified sparse feature points further defining the model of the reference object;
determining, from the model of the reference object, a second motion constraint based at least in part on the one or more user-specified sparse feature points; and
re-computing the target motion of the target pixel subject to the first motion constraint and the second motion constraint.

17. The non-transitory computer-readable medium of claim 15, wherein the target region comprises an object to be removed or modified.

18. The non-transitory computer-readable medium of claim 15, wherein the model of the reference object is a three-dimensional model, and wherein the operations further comprise:
computing the set of sparse feature points by at least executing a structure from motion process that computes, from the video frames, the three-dimensional model of the reference object.

19. The non-transitory computer-readable medium of claim 15, wherein the model is a three-dimensional model, and wherein determining the motion constraint comprises:
identifying a motion vector of the reference object through the target region that is consistent with the three-dimensional model derived from changes to a relative position of the reference object across the video frames.

20. The non-transitory computer-readable medium of claim 15, wherein computing the target motion of the target pixel subject to the motion constraint comprises:
accessing a video frame in which the target region occludes the reference object;
specifying a first motion value for a first sub-region within the target region to the target motion; and
applying, to the video frames, a machine-learning model that estimates a second motion value for a second sub-region within the target region based on both the specified first motion value and a boundary motion for the target region.

* * * * *